(12) United States Patent
Niino et al.

(10) Patent No.: US 10,538,244 B2
(45) Date of Patent: Jan. 21, 2020

(54) DRIVING ASSISTANCE APPARATUS

(71) Applicant: DENSO CORPORATION, Kariya, Aichi-pref. (JP)

(72) Inventors: Hiroaki Niino, Kariya (JP); Masao Oooka, Kariya (JP); Shotaro Fukuda, Kariya (JP); Aki Nagatomo, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 162 days.

(21) Appl. No.: 15/522,531

(22) PCT Filed: Oct. 27, 2015

(86) PCT No.: PCT/JP2015/080239
§ 371 (c)(1),
(2) Date: Apr. 27, 2017

(87) PCT Pub. No.: WO2016/068131
PCT Pub. Date: May 6, 2016

(65) Prior Publication Data
US 2017/0313311 A1    Nov. 2, 2017

(30) Foreign Application Priority Data

Oct. 31, 2014  (JP) .................................. 2014-223020
Oct. 9, 2015   (JP) .................................. 2015-201436

(51) Int. Cl.
*G06F 19/00*   (2018.01)
*B60W 30/14*   (2006.01)
(Continued)

(52) U.S. Cl.
CPC ....... *B60W 30/146* (2013.01); *B60K 31/0008* (2013.01); *B60W 30/143* (2013.01);
(Continued)

(58) Field of Classification Search
CPC ............. B60W 30/146; B60W 30/143; B60W 30/18163; B60W 40/04; B60W 50/14;
(Continued)

(56) References Cited

U.S. PATENT DOCUMENTS 8,914,181 B2 * 12/2014  Essame ........... B60W 30/18163
                                                                 701/23
9,082,239 B2 *  7/2015  Ricci ........................ B60Q 1/00
9,120,505 B2 *  9/2015  Tamura ................ B62D 15/025
(Continued)

FOREIGN PATENT DOCUMENTS

JP    H06-008747    1/1994
JP    H06-8747 A    1/1994
(Continued)

*Primary Examiner* — Ronnie M Mancho
(74) *Attorney, Agent, or Firm* — Knobbe, Martens, Olson & Bear, LLP

(57) ABSTRACT

A driving assistance apparatus is mounted in an own vehicle and performs driving assistance for the own vehicle. The driving assistance apparatus determines a travel recommended lane in which the own vehicle is to travel, based on a comparison of a preset vehicle speed set in advance to allow the own vehicle to travel at a constant speed, to a travel state of a preceding vehicle traveling ahead of the own vehicle in a travel lane in which the own vehicle is traveling and a travel state of an adjacent vehicle traveling ahead of the own vehicle in an adjacent lane that is adjacent to the travel lane. The driving assistance apparatus performs output based on the travel recommended lane.

14 Claims, 17 Drawing Sheets

(51) Int. Cl.
    *B60K 31/00*     (2006.01)
    *B60W 40/04*     (2006.01)
    *G08G 1/052*     (2006.01)
    *G08G 1/16*     (2006.01)
    *B60W 50/14*     (2012.01)
    *B60W 30/18*     (2012.01)

(52) U.S. Cl.
    CPC ...... *B60W 30/18163* (2013.01); *B60W 40/04* (2013.01); *B60W 50/14* (2013.01); *G08G 1/052* (2013.01); *G08G 1/166* (2013.01); *G08G 1/167* (2013.01); *B60W 2520/10* (2013.01); *B60W 2550/302* (2013.01); *B60W 2550/306* (2013.01); *B60W 2550/308* (2013.01); *B60W 2550/402* (2013.01); *B60W 2720/10* (2013.01)

(58) Field of Classification Search
    CPC ....... B60W 2520/10; B60W 2550/302; B60W 2550/306; B60W 2550/308; B60W 2550/402; B60W 2720/10; B60K 31/0008; G08G 1/052; G08G 1/166; G08G 1/167
    USPC .......................................................... 701/96
    See application file for complete search history.

(56) References Cited

U.S. PATENT DOCUMENTS 9,862,272 B2 *    1/2018   Schuberth ........... B60W 30/143

FOREIGN PATENT DOCUMENTS

| JP | 2003-063273 | 3/2003 |
| JP | 2004-210109 | 7/2004 |

* cited by examiner

DRIVING ASSISTANCE APPARATUS

CROSS-REFERENCE TO RELATED APPLICATION

This application is a U.S. National Phase Application under 35 U.S.C. 371 of International Application No. PCT/JP2015/080239 filed on Oct. 27, 2015 and published in Japanese as WO 2016/068131 A1 on May 6, 2016. This application is based on and claims the benefit of priority from Japanese Patent Application Nos. 2014-223020, filed Oct. 31, 2014 and 2015-201436, filed Oct. 9, 2015. The entire disclosures of all of the above applications are incorporated herein by reference.

TECHNICAL FIELD

The present invention relates to a technology that is mounted in a vehicle and performs driving assistance for the vehicle.

BACKGROUND ART

Conventionally, a technology that is mounted in a vehicle and performs various types of driving assistance for the vehicle is known. In PTL 1, a technology is proposed in which, while a vehicle is traveling at a constant speed, when an intention of the driver of the vehicle to change traffic lanes is confirmed, a preset vehicle speed set to allow the vehicle to travel at the constant speed is corrected towards a higher side and increased. As a result, lane change in time with the flow of traffic is performed.

CITATION LIST

Patent Literature

[PTL 1] JP-A-H06-8747

SUMMARY OF INVENTION

Technical Problem

However, in the conventional technology described in PTL 1, the driver of an own vehicle themselves is required to determine the traffic lane in which the own vehicle is to travel.

The inventors of the present invention have studied technologies that enable a driving assistance apparatus to determine the traffic lane in which the own vehicle is to travel, in place of the driver of the own vehicle. As a result, the inventors have found that, to determine the traffic lane in which the own vehicle is to travel, such as when changing traffic lanes, merely taking into consideration the state of the own traffic lane and the state of an adjacent lane is insufficient.

Thus, an object of the present invention is to provide an apparatus that is capable of suitably determining a traffic lane in which an own vehicle is to travel, without making a driver of the own vehicle themselves make the determination.

Solution to Problem

An aspect of the present invention is a driving assistance apparatus that is mounted in an own vehicle and performs driving assistance for the own vehicle. The driving assistance apparatus includes a first determining means and an output means. The first determining means determines a travel recommended lane in which the own vehicle is to travel, based on a comparison of a preset vehicle speed set in advance to allow the own vehicle to travel at a constant speed, with a travel state of a preceding vehicle traveling ahead of the own vehicle in a travel lane in which the own vehicle is traveling and a travel state of an adjacent vehicle traveling ahead of the own vehicle in an adjacent lane that is adjacent to the travel lane. The output means performs output based on the travel recommended lane.

As a result of a configuration such as this, the travel recommended lane is determined based on the preset vehicle speed, and the travel state of the preceding vehicle and the travel state of the adjacent vehicle. Therefore, the traffic lane in which the own vehicle is to travel can be suitably determined without the driver of the own vehicle themselves making the determination.

Reference numbers within the parentheses in recited in the claims indicate corresponding relationships with specific means according to embodiments described hereafter as an aspect, and do not limit the technical scope of the present invention.

DESCRIPTION OF EMBODIMENTS

Embodiments to which the present invention is applied will hereinafter be described with reference to the drawings.

1. First Embodiment

1-1. Configuration

Figure 1:
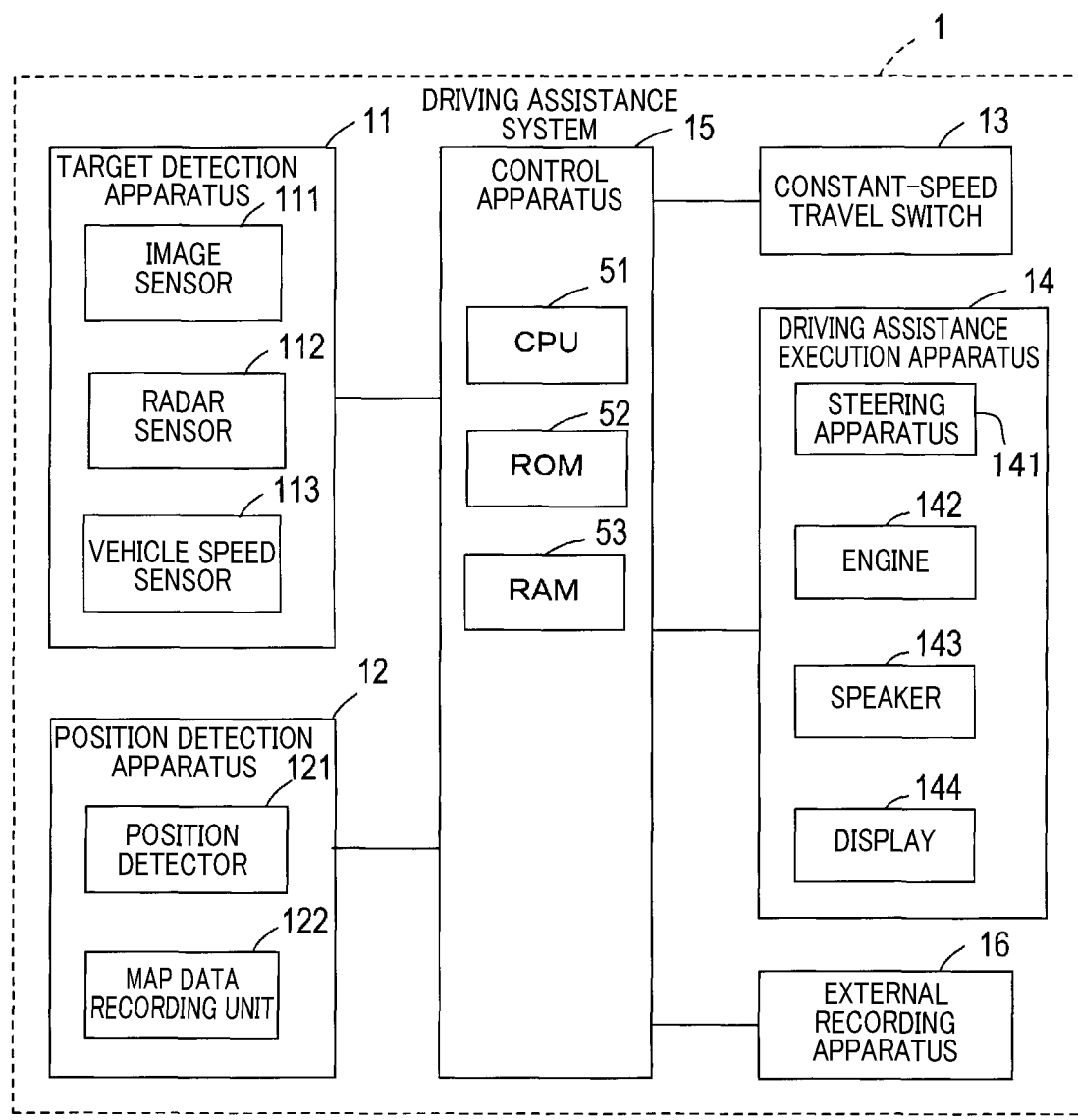
FIG. 1 is a block diagram of a configuration of a driving assistance system.

A driving assistance system 1 shown in FIG. 1 is a system that is mounted in a vehicle (own vehicle). The driving assistance system 1 includes a target detection apparatus 11, a position detection apparatus 12, a constant-speed travel switch 13, a driving assistance execution apparatus 14, and a control apparatus 15.

The target detection apparatus 11 is an apparatus that detects various types of targets present in the periphery of the own vehicle in which the driving assistance system 1 is mounted. For example, the target detection apparatus 11 includes an image sensor 11, a radar sensor 112, and a vehicle speed sensor 113.

The image sensor 111 captures an image of an area ahead of the vehicle and acquires image data. The image sensor 111 then performs image processing on the acquired image data and thereby detects a target present within a predetermined imaging area. The image sensor 111 then outputs the detection result to the control apparatus 15.

The radar sensor 112 transmits radio waves ahead of the vehicle. Then, based on reception results of reflected waves from a target positioned ahead of the vehicle, the radar sensor 112 detects at least a distance between the own vehicle and the target and a relative speed between the own vehicle and the target. The radar sensor 112 then outputs the detection result to the control apparatus 15. A millimeter-wave radar or a laser radar (not shown) may be provided as the radar sensor 112.

The image sensor 111 and the radar sensor 112 are merely required to be capable of detecting at least a target necessary for a tracking process (described hereafter) performed by the control apparatus 15. According to the present embodiment, the image sensor 111 and the radar sensor 112 detect at least a preceding vehicle and an adjacent vehicle. The preceding vehicle refers to a vehicle that is traveling in a travel lane ahead of the own vehicle (a vehicle traveling directly in front of the own vehicle). The travel lane refers to the traffic lane in which the own vehicle is traveling. The adjacent vehicle refers to a vehicle that is traveling ahead of the own vehicle in an adjacent lane that is adjacent to the travel lane.

The vehicle speed sensor 113 is a known vehicle speed sensor that detects a rotation speed of an axle of the own vehicle and calculates a speed of the own vehicle based on the detected rotation speed. The vehicle speed sensor 113 then outputs the calculated vehicle speed to the control apparatus 15.

The position detection apparatus 12 is an apparatus that detects a current position of the own vehicle. For example, the position detection apparatus 12 includes a position detector 121 and a map data recording unit 122.

The position detector 121 includes a global positioning system (GPS) receiver, a gyroscope, and a distance sensor (not shown). The GPS receiver receives transmission signals from artificial satellites for GPS and detects positional coordinates and an altitude of the own vehicle. The gyroscope outputs a detection signal based on an angular velocity of rotational motion applied to the own vehicle. The distance sensor outputs a travel distance of the own vehicle. The position detector 121 calculates the current position of the own vehicle based on the output signals from the sensors, and outputs the calculation result to the control apparatus 15.

The map data recording unit 122 is a recording unit in which map data indicating a map is recorded. As information related to roads that can be traveled by the vehicle, the map data includes information indicating road types (expressways, national highways, other general roads, and the like), information indicating curved roads, and the like, as well as information indicating whether a road allows lane change.

The constant-speed travel switch 13 is a switch for detecting an instruction from the driver of the own vehicle to perform constant-speed travel control. Constant-speed travel control refers to control performed to allow the own vehicle to travel at a preset vehicle speed. The preset vehicle speed refers to a vehicle speed set by the driver of the own vehicle in advance. Hereafter, a state in which the instruction from the driver of the own vehicle to perform constant-speed travel is detected by the constant-speed travel switch 13 is referred to as constant-speed travel mode.

The driving assistance execution apparatus 14 includes a plurality of apparatuses that control the behaviors of control subjects in a body system, a power train system, and a chassis system of the vehicle. The control subjects may include at least a steering apparatus (such as electric power steering) 141, an engine 142, a speaker 143, a display 144, a braking apparatus such as brakes (not shown), a driving apparatus for an accelerator, and the like.

According to the present embodiment, the display 144 is a touch-panel display that is capable of receiving input from the driver of the own vehicle. In addition, the apparatuses configuring the driving assistance execution apparatus 14 may be apparatuses that perform known vehicle control such as steering control, engine control, constant-speed travel control, and various types of warning control such as speed warning, collision warning, and inter-vehicle warning, by controlling the behaviors of the control subjects based on the traveling state of the vehicle, as well as controlling the behaviors of the control subjects based on commands from the control apparatus 15.

The control apparatus 15 is an electronic control unit that includes a central processing unit (CPU) 51, a read-only memory (ROM) 52, a random access memory (RAM) 53, and the like. The control apparatus 15 performs integrated control of the driving assistance system 1 by the CPU 51 performing various processes based on programs recorded in a recording medium such as the ROM 52. For example, the CPU 51 performs processes to output commands for the various types of vehicle control described above. In addition, the CPU 51 performs a tracking process to allow the own vehicle to track a vehicle traveling ahead of the own vehicle, in parallel to these processes.

An external recording apparatus 16 is a rewritable recording apparatus, such as a flash ROM. The external recording apparatus 16 records the preset vehicle speed for the above-described constant-speed control, a change-amount upper limit value, described hereafter, and the like.

1-2. Processes

Figure 2:
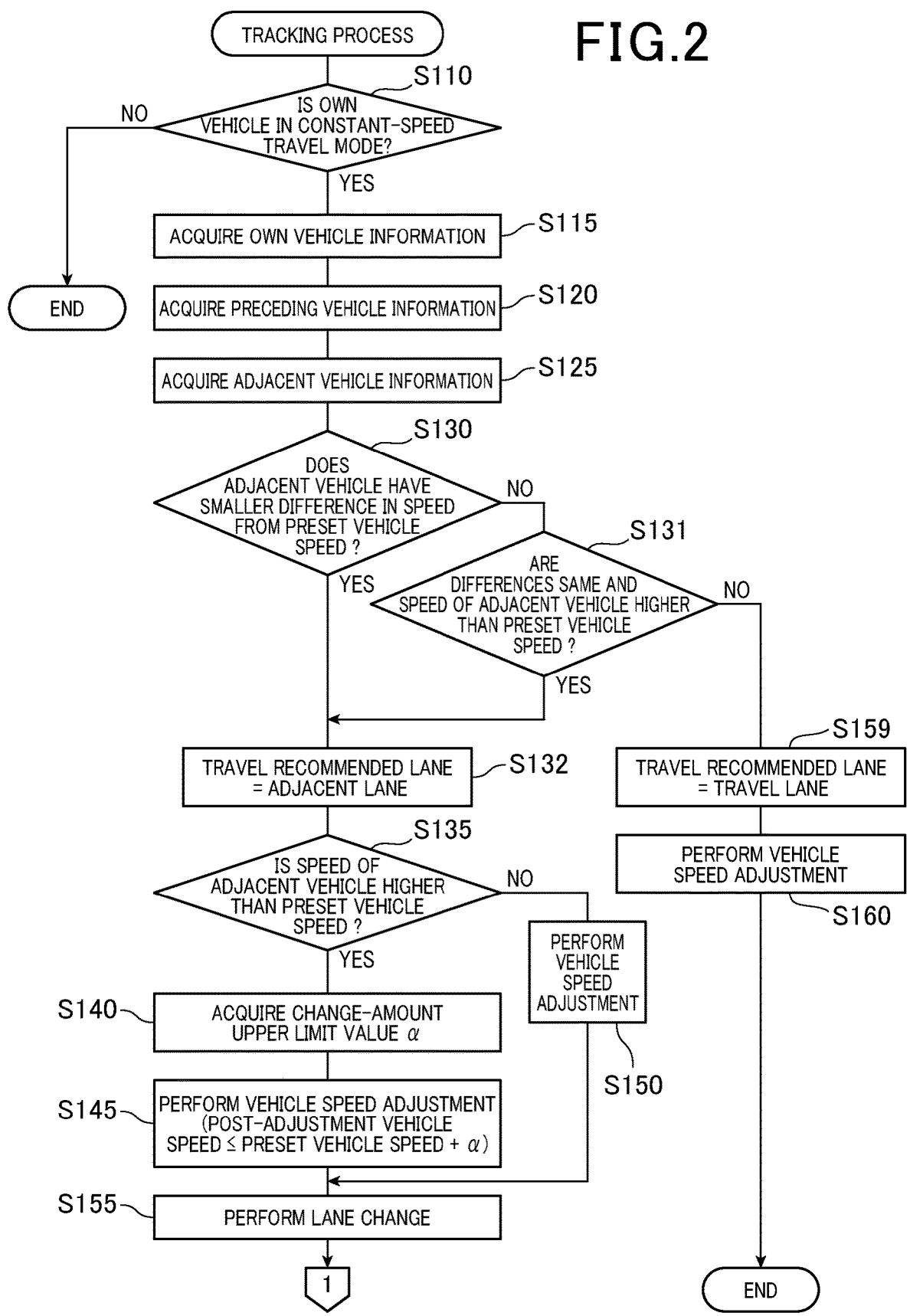
FIG. 2 is a flowchart (1/2) of a tracking process according to a first embodiment.
Figure 3:
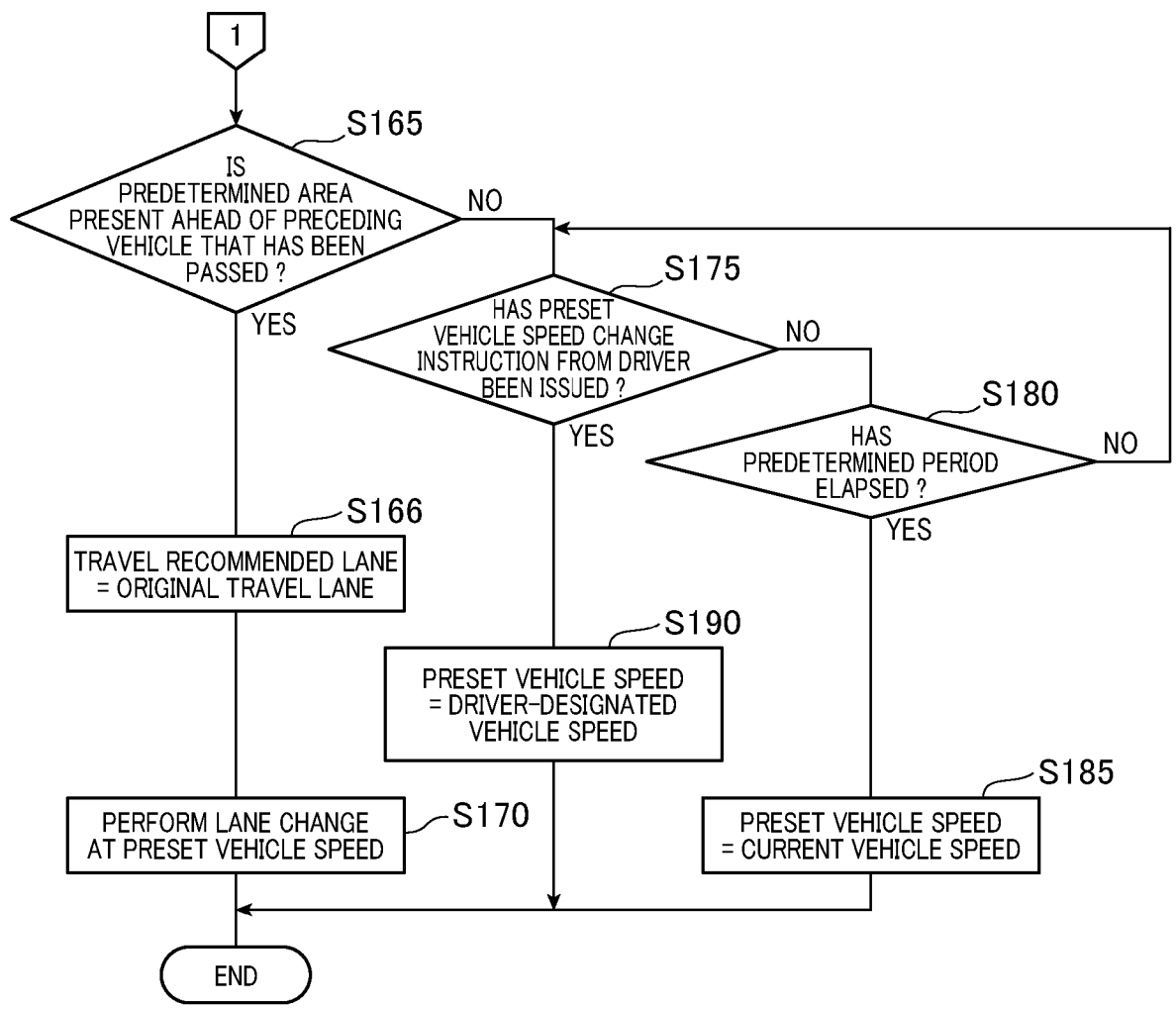
FIG. 3 is a flowchart (2/2) of the tracking process according to the first embodiment.

Next, the tracking process performed by the control apparatus 15 (CPU 51) will be described with reference to the flowcharts in FIGS. 2 and 3. The process shown in FIGS. 2 and 3 is repeatedly performed while the own vehicle is traveling on a road in which lane change is possible.

First, at step S110, the control apparatus 15 determines whether or not the own vehicle is in constant-speed travel mode. Specifically, the control apparatus 15 determines whether or not the own vehicle is in constant-speed travel mode based on the output result of the constant-speed travel switch 13, as described above. When determined that the own vehicle is in constant-speed travel mode, the control apparatus 15 proceeds to step S115. When determined that the own vehicle is not in constant-speed travel mode, the control apparatus 15 ends the present tracking process.

At step S115, the control apparatus 15 acquires own vehicle information. Specifically, the control apparatus 15 acquires the vehicle speed of the own vehicle and the preset vehicle speed as the own vehicle information.

At step S120, the control apparatus 15 acquires preceding vehicle information. Specifically, the control apparatus 15 acquires an inter-vehicle distance and a relative speed between the preceding vehicle and the own vehicle as the preceding vehicle information.

At step S125, the control apparatus 15 acquires adjacent vehicle information. Specifically, the control apparatus 15 acquires an inter-vehicle distance and a relative speed between the adjacent vehicle and the own vehicle as the adjacent vehicle information.

At step S130, the control apparatus 15 determines whether or not, of the preceding vehicle and the adjacent vehicle, the vehicle having a smaller difference in speed from the preset vehicle speed is the adjacent vehicle. Specifically, the control apparatus 15 determines the smaller of the difference between the speed of the preceding vehicle and the preset vehicle speed, and the difference between the speed of the adjacent vehicle and the preset vehicle speed, based on the own vehicle information, the preceding vehicle information, and the adjacent vehicle information acquired at steps S110 to S125.

Here, when determined that the difference between the speed of the adjacent vehicle and the preset vehicle speed is smaller than the difference between the speed of the preceding vehicle and the preset vehicle speed, the control apparatus 15 proceeds to step S132, with lane change to the adjacent vehicle set as recommended behavior. Meanwhile, when determined that the difference between the speed of the adjacent vehicle and the preset vehicle speed is equal to or greater than the difference between the speed of the preceding vehicle and the preset vehicle speed, the control apparatus 15 proceeds to step S131.

At step S131, the control apparatus 15 makes an affirmative determination when the difference between the speed of the preceding vehicle and the preset vehicle speed and the difference between the speed of the adjacent vehicle and the preset vehicle speed are the same, and the speed of the adjacent vehicle is higher than the preset vehicle speed. The control apparatus 15 proceeds to step S132, with lane change to the adjacent lane set as the recommended behavior. Meanwhile, when a negative determination is made, the control apparatus 15 proceeds to step S159, with tracking of the preceding vehicle set as the recommended behavior.

When tracking of the preceding vehicle is set as the recommended behavior (NO at step S130 and NO at step S131), the control apparatus 15 proceeds to step S159. At step S159, the control apparatus 15 determines that the travel lane is a travel recommended lane and records the travel lane as the travel recommended lane in the RAM 53. The control apparatus 15 then proceeds to step S160. The travel recommended lane is a traffic lane in which travel by the own vehicle is recommended. Setting the travel lane as the travel recommended lane means, in other words, to set tracking of the preceding vehicle (in the travel lane) as the recommended behavior.

Next, at step S160, the control apparatus 15 performs vehicle speed adjustment and ends the present tracking process. According to the present embodiment, the control apparatus 15 outputs a command to the driving assistance execution apparatus 14 to allow the own vehicle to travel at a speed at which an inter-vehicle distance in relation to the preceding vehicle, prescribed in advance, is maintained and the preset vehicle speed is not exceeded. After control to allow the own vehicle to track the preceding vehicle is performed in this way, the control apparatus 15 ends the present tracking process.

When lane change is set as the recommended behavior (YES at step S130 or YES at step S131), the control apparatus 15 proceeds to step S132. At step S132, the control apparatus determines that the adjacent lane is the travel recommended lane and records the adjacent lane as the travel recommended lane in the RAM 53. The control apparatus 15 then proceeds to S135. Setting the adjacent lane as the travel recommended lane means, in other words, to set lane change to the adjacent lane as the recommended behavior.

Next, at step S135, the control apparatus 15 determines whether or not the speed of the adjacent vehicle is higher than the preset vehicle speed. When determined that the speed of the adjacent vehicle is higher than the preset vehicle speed, the control apparatus 15 proceeds to step S140. When determined that the speed of the adjacent vehicle is equal to or lower than the preset vehicle speed, the control apparatus 15 proceeds to step S150.

When determined that the speed of the adjacent vehicle is equal to or lower than the preset vehicle speed (NO at step S135), the control apparatus 15 proceeds to step S150. At step S150, the control apparatus 15 performs vehicle speed adjustment. Specifically, for example, the control apparatus 15 outputs a command to the driving assistance execution apparatus 14 to allow the own vehicle to travel at the same speed as the speed of the adjacent vehicle. After performing vehicle speed adjustment, the control apparatus 15 proceeds to step S155.

When determined that the speed of the adjacent vehicle is higher than the preset vehicle speed (YES at step S135), the control apparatus 15 proceeds to step S140. At step S140, the control apparatus 15 acquires a change-amount upper limit value $\alpha$. The change-amount upper limit value $\alpha$ is a maximum value of a change amount by which the speed of the own vehicle can be changed from the preset vehicle speed, when the speed of the own vehicle is to be changed to a value greater than the preset vehicle speed. The change-amount upper limit value $\alpha$ is recorded in the external recording apparatus 16 in advance. For example, the change-amount upper limit value $\alpha$ is set in advance to a value that, when the speed of the own vehicle becomes a speed obtained by the change-amount upper limit value $\alpha$ being added to the preset vehicle speed, the driver of the own vehicle does not feel unease even when the own vehicle travels at this speed. As an example, according to the present embodiment, the change-amount upper limit value $\alpha$ is set to 10 km/h.

At subsequent step S145, the control apparatus 15 performs vehicle speed adjustment. Specifically, with the speed obtained by the change-amount upper limit value $\alpha$ being added to the preset vehicle speed as the speed of the own vehicle after adjustment, the control apparatus 15 outputs a command to the driving assistance execution apparatus 14 to allow the own vehicle to travel at this speed.

Next, at step S155, the control apparatus 15 allows the own vehicle to travel at a lane-change vehicle speed and performs lane change. The lane-change vehicle speed refers to a speed of the own vehicle for performing lane change. According to the present embodiment, the control apparatus 15 outputs a command to the driving assistance execution apparatus 14 to perform lane change of the own vehicle with the vehicle speed (current vehicle speed) adjusted at step S145 or S150 as the lane-change vehicle speed.

At subsequent step S165, the control apparatus 15 determines whether or not a predetermined area, that is, an area of a size necessary for performing lane change is present ahead of the preceding vehicle that has been passed as a result of the lane change performed at step S155. Specifically, the control apparatus 15 determines that the area of a size necessary for performing lane change is present when another vehicle is not present ahead of the preceding vehicle that has been passed, within the range of a safety distance, prescribed in advance, from the preceding vehicle that has been passed, along the traffic lane in which the preceding vehicle is traveling.

The safety distance may be a fixed value. Alternatively the safety distance may be a value prescribed based on the speed of the own vehicle, or a value prescribed based on the speed of the own vehicle and the speed of the preceding vehicle that has been passed (relative speed). The safety distance is recorded in advance in the external recording apparatus 16. The method for determining whether or not the area of a size necessary for performing lane change is present, described herein, is an example. The determination may be made by other methods. When determined that the area is present, the control apparatus 15 proceeds to step S166. When determined that the area is not present, the control apparatus 15 proceeds to step S175.

When determined that the area of a size necessary for performing lane change is present ahead of the preceding vehicle that has been passed (YES at step S165), the control apparatus 15 proceeds to step S166. At step S166, the control apparatus 15 determines that the original travel lane is the travel recommended lane and records the original travel lane as the travel recommended lane in the RAM 53. The control apparatus 15 then proceeds to step S170. The original travel lane refers to the traffic lane in which the preceding vehicle that has been passed as a result of lane change is traveling. In other words, the travel lane in which the own vehicle had been traveling before performing lane change at step S155 is the original travel lane.

Next, at step S170, the control apparatus 15 outputs a command to the driving assistance execution apparatus 14 to perform lane change at the preset vehicle speed. The control apparatus 15 then ends the present tracking process.

When determined that the area of a size necessary for performing lane change is not present ahead of the preceding vehicle that has been passed (NO at step S165), the control apparatus 15 proceeds to step S175. At step S175, the control apparatus 15 determines whether or not a preset vehicle speed change instruction has been issued from the driver of the own vehicle. The preset vehicle speed instruction is an instruction to change the preset vehicle speed. Here, when determined that the preset vehicle speed change instruction has been issued, the control apparatus 15 proceeds to step S190. When determined that the preset vehicle speed change instruction has not been issued, the control apparatus 15 proceeds to step S180.

When determined that the preset vehicle speed change instruction has not been issued (NO at step S175), the control apparatus 15 proceeds to step S180. At step S180, the control apparatus 15 determines whether or not a predetermined period has elapsed. Here, when determined that the predetermined period has not elapsed, the control apparatus 15 proceeds to step S175. When determined that the predetermined period has elapsed, the control apparatus 15 proceeds to step S185.

At step S185, the control apparatus 15 resets the current vehicle speed as a new preset vehicle speed, that is, records (rewrites) the current vehicle speed as the preset vehicle speed in the external recording apparatus 16. The control apparatus 15 then ends the present tracking process.

When determined that the preset vehicle speed change instruction has been issued (YES at step S175), the control apparatus 15 proceeds to step S190. At step S190, the control apparatus 15 performs resetting with a driver-designated vehicle speed as the present vehicle speed, that is, records the driver-designated vehicle speed as the preset vehicle speed in the external recording apparatus 16. The driver-designated vehicle speed is a vehicle speed designated by the driver of the own vehicle. The control apparatus 15 then ends the present tracking process.

In other words, it is considered that, for the driver of the own vehicle, traveling in the original travel lane in which the own vehicle had been traveling with the set preset vehicle speed is the originally desired travel control. Therefore, when lane change is performed (step S155), should travel once again in the original travel lane be possible (YES at step S165), the control apparatus 15 performs lane change to the original travel lane (step S170). The control apparatus 15 then ends the present tracking process.

In addition, when lane change is performed (step S155) and travel once again in the original travel lane is not possible (NO at step S165), should the preset vehicle speed change instruction from the driver of the own vehicle not be issued (NO at step S175), the control apparatus 15 changes the preset vehicle speed to perform tracking at a speed that is as close as possible to that of the preceding vehicle in the traffic lane in which the own vehicle is traveling after the lane change, that is, the adjacent vehicle before the lane change (step S185). The control apparatus 15 then ends the present tracking process.

1-3. Workings

Next, the workings of the driving assistance system 1 will be described with reference to FIGS. 4 to 7. In the examples shown in FIGS. 4 to 7, an own vehicle 100 is assumed to be set to constant-speed travel mode and traveling with the preset vehicle speed as the current vehicle speed, unless otherwise stated.

Figure 4:
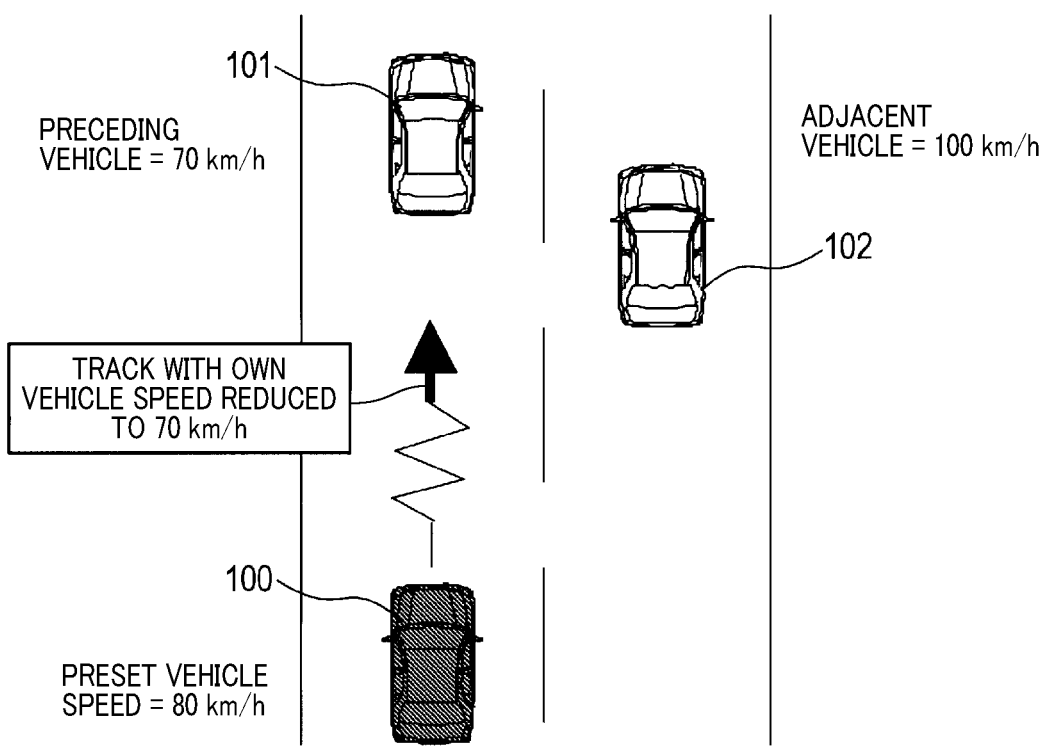
FIG. 4 is a diagram of an example in which a preceding vehicle is tracked.

In the example shown in FIG. 4, a state is shown in which the preset vehicle speed of the own vehicle 100 is 80 km/h. The speed of a preceding vehicle 101 is 70 km/h. The speed of an adjacent vehicle 102 is 100 km/h. In this case, of the preceding vehicle 101 and the adjacent vehicle 102, the preceding vehicle 101 has the smaller difference in speed from the preset vehicle speed. Therefore, control in which the own vehicle is allowed to track the preceding vehicle 101 with the speed reduced to 70 km/h (step S160) is performed In the example shown in FIG. 5A, a state is shown in which the preset vehicle speed of the own vehicle 100 is 90 km/h. The speed of the preceding vehicle 101 is 70 km/h. The speed of the adjacent vehicle 102 is 100 km/h. In this case, of the preceding vehicle 101 and the adjacent vehicle 102, the adjacent vehicle 102 has the smaller difference in speed from the preset vehicle speed. Therefore, control in which lane change is performed with the speed increased to 100 km/h and the own vehicle 100 is allowed to track the adjacent vehicle 102 is performed. One hundred km/h, which is the speed of the own vehicle 100 at this time, is a value obtained by the change-amount upper limit value α (10 km/h) being added to 90 km/h, which is the preset vehicle speed (step S145).

Figure 5A:
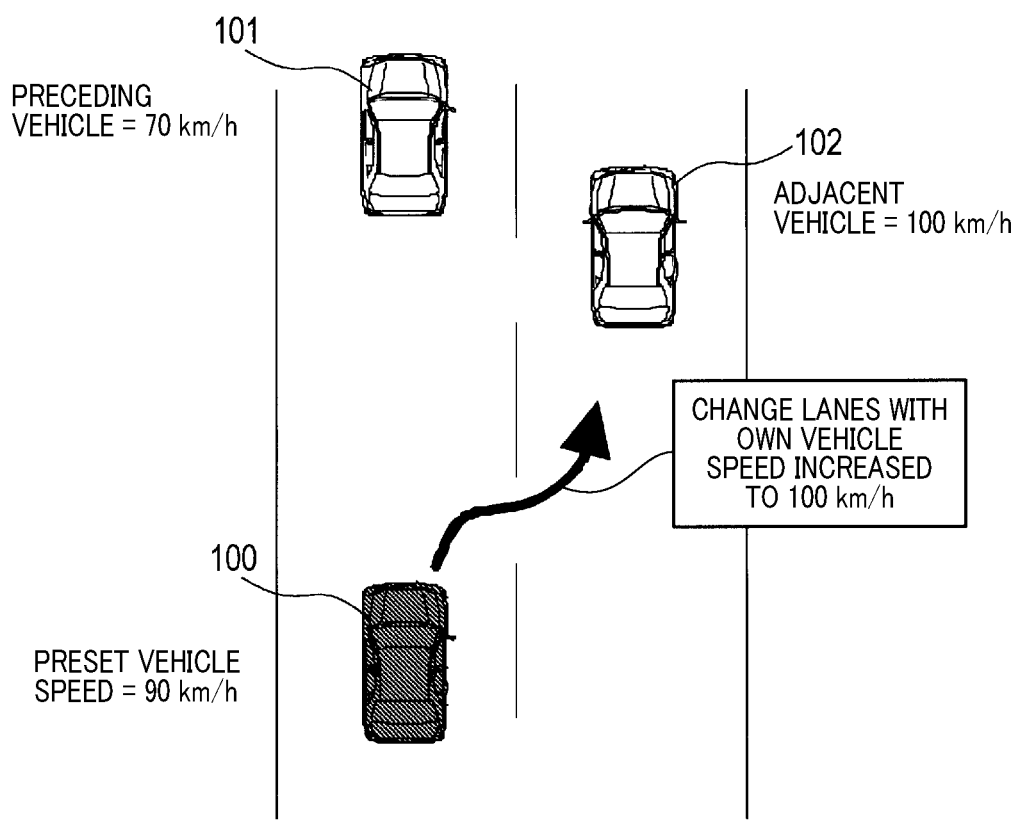
FIG. 5A is a diagram of an example of the behavior of an own vehicle when an adjacent vehicle is traveling at 100 km/h.
Figure 5B:
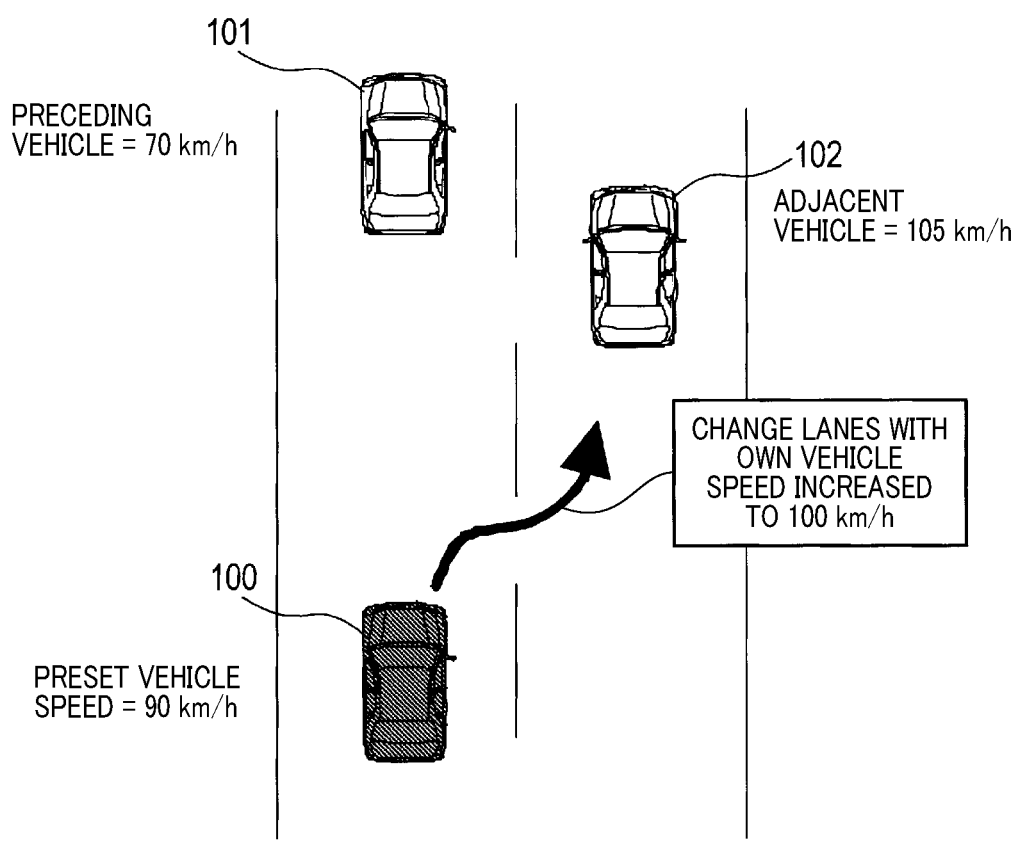
FIG. 5B is a diagram of an example of the behavior of the own vehicle when the adjacent vehicle is traveling at 105 km/h.

In addition, according to the present embodiment, as in the example shown in FIG. 5B, even in a state in which the speed of the adjacent vehicle 102 is 105 km/h, control in which lane change is performed with the speed of the own vehicle 100 set to 100 km/h and the own vehicle 100 is allowed to track the adjacent vehicle 102 is performed. One hundred km/h is the value obtained by the change-amount upper limit value α (10 km/h) being added to 90 km/h, which is the preset vehicle speed. In this way, in the driving assistance system 1, travel control of the own vehicle 100 is performed at a vehicle speed equal to or less than the value obtained by the change-amount upper limit value α being added to the preset vehicle speed.

Figure 5C:
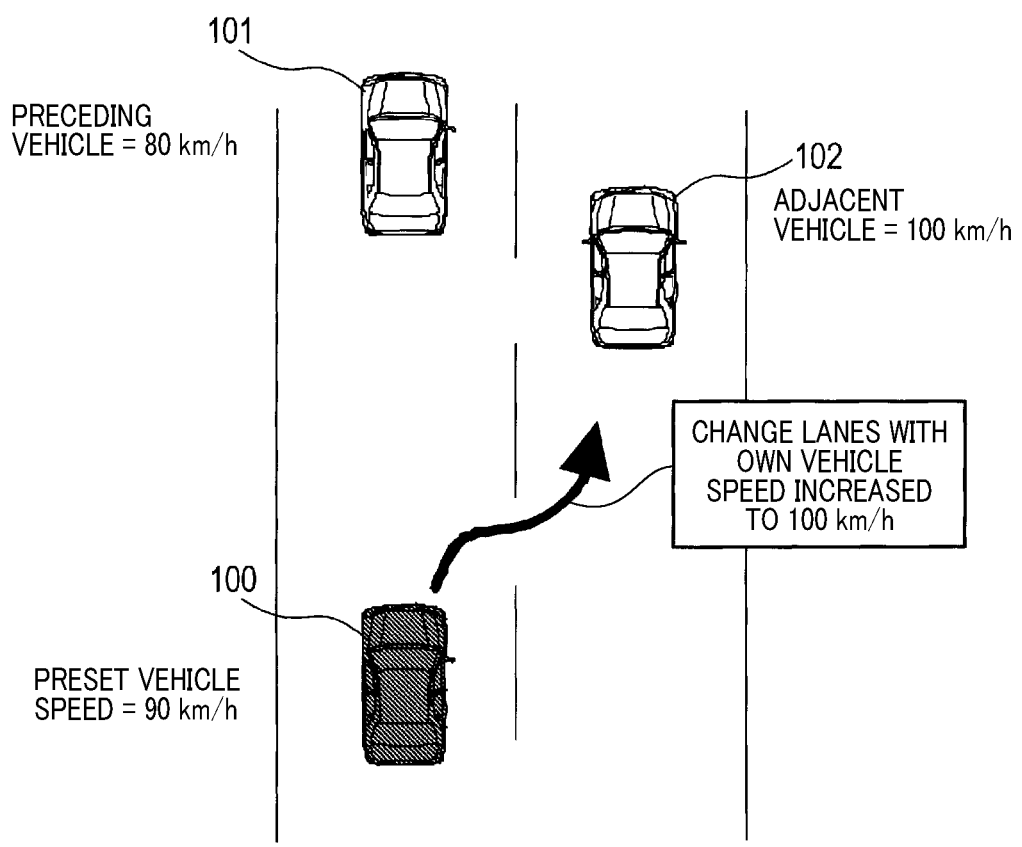
FIG. 5C is a diagram of an example of the behavior of the own vehicle when a difference in speed between the vehicle speed and a preset vehicle speed is the same for the preceding vehicle and the adjacent vehicle, and the speed of the adjacent vehicle is higher than the preset vehicle speed.

In addition, in the example shown in FIG. 5C, a state is shown in which the preset vehicle speed of the own vehicle 100 is 90 km/h. The speed of the preceding vehicle 101 is 80 km/h. The speed of the adjacent vehicle 102 is 100 km/h. In this case, the difference in speed between the vehicle speed and the preset vehicle speed is the same for the preceding vehicle 101 and the adjacent vehicle 102. However, the speed of the adjacent vehicle 102 is higher than the preset vehicle speed of the own vehicle 100 (step S131). Therefore, control in which lane change is performed with the speed of the own vehicle 100 increased to 100 km/h and the own vehicle 100 is allowed to track the adjacent vehicle 102 is performed.

Figure 6:
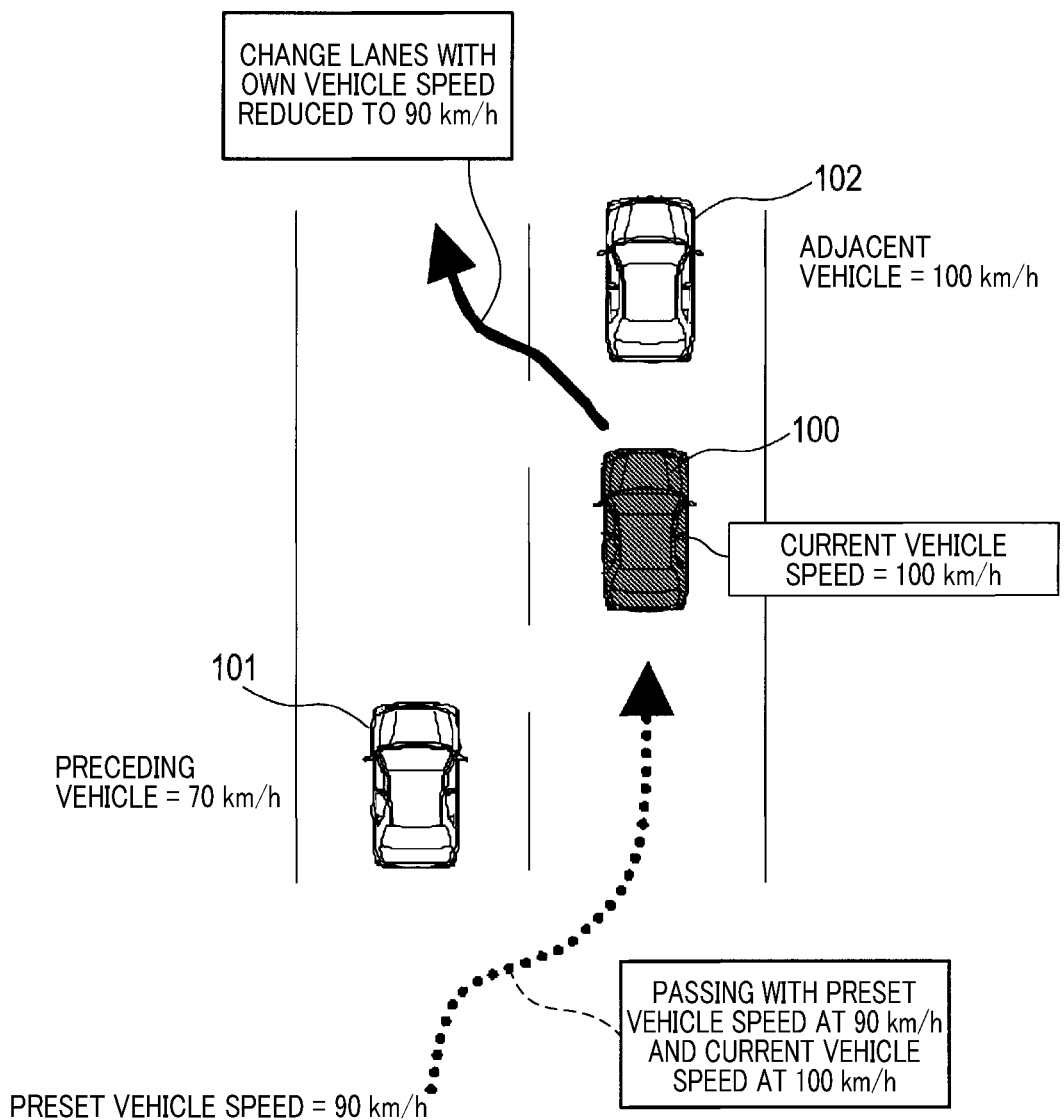
FIG. 6 is a diagram of an example of the behavior of the own vehicle when an area of a size necessary for lane change is present ahead of the preceding vehicle that has been passed.

In the example shown in FIG. 6, a state is shown in which, after the lane change is performed in the state shown in FIG. 5A, that is, the preceding vehicle 101 is passed, the area of a size necessary for performing lane change is present ahead of the preceding vehicle 101 that has been passed. In this case, lane change is performed with the speed of the own vehicle 100 reduced to 90 km/h, which is the preset vehicle speed (step S170).

Figure 7:
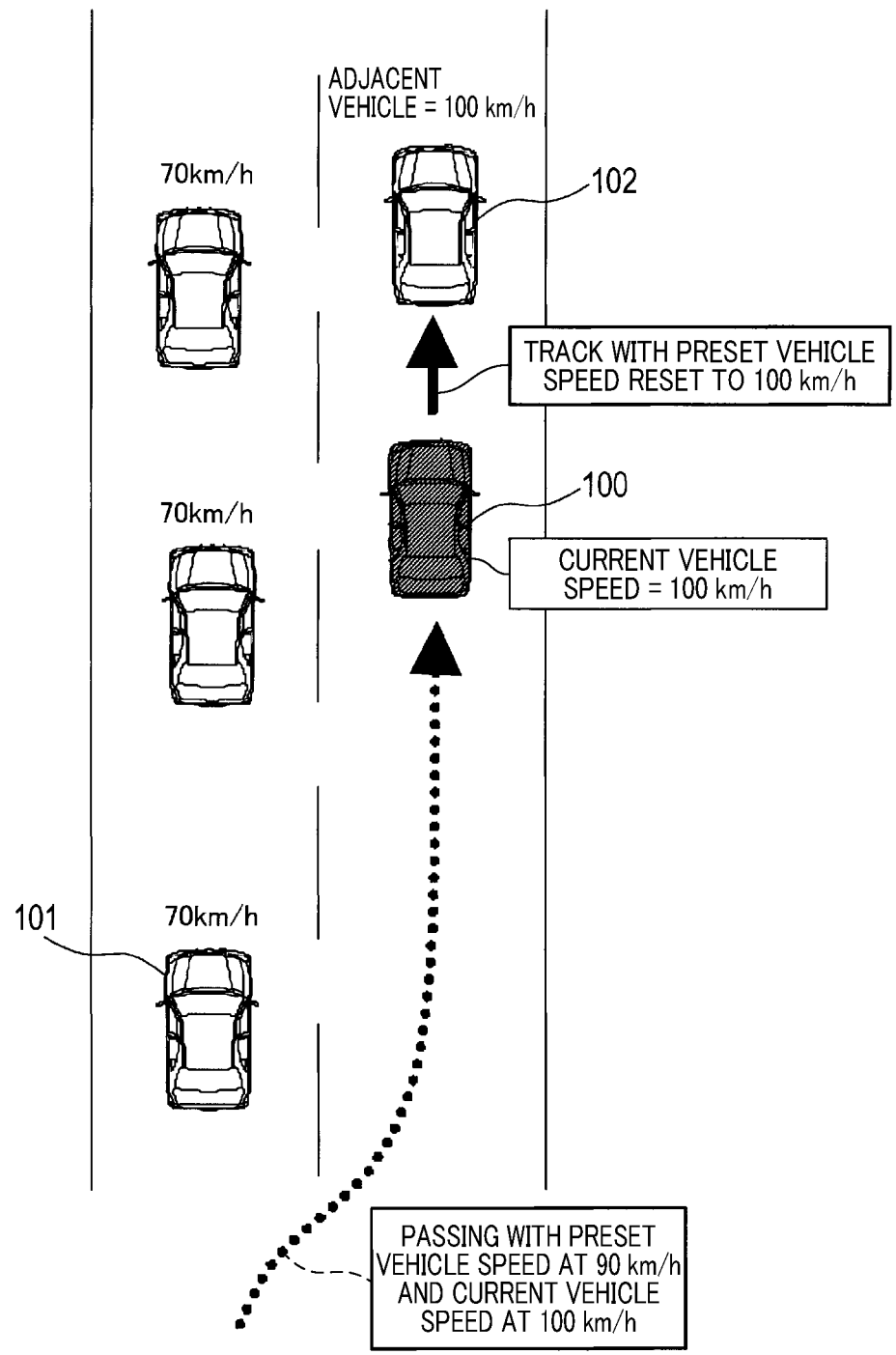
FIG. 7 is a diagram of an example of the behavior of the own vehicle when the area of a size necessary for lane change is not present ahead of the preceding vehicle that has been passed.

In the example shown in FIG. 7, a state is shown in which, after the lane change is performed in the state shown in FIG. 5A, that is, the preceding vehicle 101 is passed, the area of a size necessary for performing lane change is not present ahead of the preceding vehicle 101 that has been passed. In this case, when the driver of the own vehicle issues the preset vehicle speed change instruction to change the preset vehicle speed to, for example, 100 km/h, which is the current speed of the own vehicle 100 (YES at step S175), the preset vehicle speed is set to 100 km/h, which is the driver-designated vehicle speed (step S190). In addition, when the driver of the own vehicle has not issued the preset vehicle speed change instruction even after the elapse of the predetermined period (YES at step S180), the preset vehicle speed is set to 100 km/h, which is the current speed (lane-change vehicle speed) of the own vehicle 100 (step S185).

1-4. Effects

According to the first embodiment described in detail above, the following effects are achieved.

[1A] Output to allow the own vehicle to travel such as to track, of the preceding vehicle and the adjacent vehicle, the vehicle traveling at the speed closer to the preset vehicle speed is performed. Specifically, when the difference between the speed of the adjacent vehicle and the preset vehicle speed is smaller than the difference between the speed of the preceding vehicle and the preset vehicle speed, lane change to the adjacent lane is set as recommended behavior and output is performed based on the recommended behavior. That is, when the preceding vehicle is traveling at a speed closer to the preset vehicle speed than the adjacent vehicle, output to allow the own vehicle to track the preceding vehicle is performed. When the adjacent vehicle is traveling at a speed closer to the preset vehicle speed than the preceding vehicle, output to perform lane change and allow the own vehicle to track the adjacent vehicle is performed. As a result of a configuration such as this, output to allow the own vehicle to travel in time with the flow of traffic at a speed close to the preset vehicle speed can be performed.

In addition, when the difference between the speed of the adjacent vehicle and the preset vehicle speed, and the difference between the speed of the preceding vehicle and the preset vehicle speed are the same, and the speed of the adjacent vehicle is higher than the preset vehicle speed, output to set lane change to the adjacent lane as the recommended behavior is performed. Conversely, when the differences in speed are the same and the speed of the preceding vehicle is higher than the preset vehicle speed, the travel lane in which the preceding vehicle is traveling is determined to be the travel recommended lane. Output to set tracking of the preceding vehicle as the recommended behavior is performed.

That is, when the differences in speed are the same, the traffic lane in which the vehicle traveling at a speed higher than the preset vehicle speed is traveling is set as the travel recommended lane. Output to allow the own vehicle to track the vehicle is performed. A reason for this is that, in a state in which the own vehicle cannot travel at the preset vehicle speed and is required to travel at a speed close to the preset vehicle speed, it is considered more desirable to the driver of the own vehicle to be able to travel at a speed higher than the preset vehicle speed rather than to travel at a speed lower than the preset vehicle speed.

Based on the foregoing, even while the own vehicle is traveling at a speed close to the preset vehicle speed, output to allow the own vehicle to travel at a speed considered desirable for the driver of the own vehicle can be performed.

[1B] A command to control the own vehicle based on the recommended behavior is outputted to the driving assistance execution apparatus 14. As a result, automatic travel control of the own vehicle based on the recommended behavior can be performed.

[1C] When the recommended behavior is lane change to the adjacent lane, should the speed of the adjacent vehicle be higher than the preset vehicle speed, the own vehicle travels at the lane-change vehicle speed equal to or higher than the preset vehicle speed until the lane change to the adjacent lane is completed. As a result, the own vehicle can smoothly change traffic lanes in time with the flow of traffic.

[1D] The-lane change vehicle speed is set to be equal to or less than a value obtained by the change-amount upper limit value α, which is a predetermined upper limit value, being added to the preset vehicle speed. As a result, lane change being performed at a speed exceeding the skills of the driver of the own vehicle can be suppressed. Consequently, causing the driver of the own vehicle to experience unease when performing lane change of the own vehicle can be suppressed.

[1E] After lane change is performed, when the area of a size necessary for lane change is present ahead of the preceding vehicle that has been passed, the own vehicle is allowed to perform lane change to the traffic lane in which the preceding vehicle that has been passed is traveling. That is, it is considered that, for the driver of the own vehicle, traveling in the original travel lane in which the own vehicle had been traveling with the set preset vehicle speed is the originally desired travel control. Therefore, should travel once again in the original travel lane be possible (YES at step S165) after the lane change is performed (step S155), lane change to the original travel lane is performed. The present tracking process is then ended. As a result, travel control that is close to the traveling intended by the driver of the own vehicle can be performed.

[1F] When the area of a size necessary for lane change is not present ahead of the preceding vehicle that has been passed, should an instruction from the driver of the own vehicle regarding changing the preset vehicle speed be issued, the preset vehicle speed is changed to the driver-designated vehicle speed designated by the driver of the own vehicle. As a result, the own vehicle can be allowed to travel at the speed designated by the driver of the own vehicle, in time with the flow of the traffic lane in which the own vehicle is currently traveling.

[1G] When an instruction from the driver of the own vehicle regarding changing the preset vehicle speed has not been issued, the preset vehicle speed is changed to the lane-change vehicle speed after the predetermined period has elapsed. As a result, the preset vehicle speed is changed to the lane-change vehicle speed after the elapse of the predetermined period, that is, at a timing at which the driver of the own vehicle can be considered to have grown accustomed to traveling at the lane-change vehicle speed. Therefore, the own vehicle can subsequently travel at the same speed as other vehicles in its traffic lane in which the own vehicle is currently traveling.

According to the first embodiment, the control apparatus 15 corresponds to an example of a driving assistance apparatus. In addition, steps S132 and S159 correspond to an example of a process serving as a first determining means. Steps S145 and S155 correspond to an example of a process serving as an output means. In addition, step S166 corresponds to an example of a process serving as a third determining means.

In a configuration [4F] described hereafter, step S130 corresponds to an example of a process serving as a determining means. Steps S145, S150, S155, S160, S170, and S185 correspond to an example of a process serving as an output means.

1-5. Variation Examples (1) According to the above-described embodiment, after lane change from the travel lane to the adjacent lane is performed, when the area of a size necessary for performing lane change is not present ahead of the preceding vehicle that has been passed, the process for changing the preset vehicle speed to the lane-change vehicle speed is performed after the elapse of the predetermined period, even when an instruction from the driver of the own vehicle to change the preset vehicle speed has not been issued. In this regard, the preset vehicle speed may not be changed when the instruction from the driver of the own vehicle to change the preset vehicle speed has not been issued.

Figure 8:
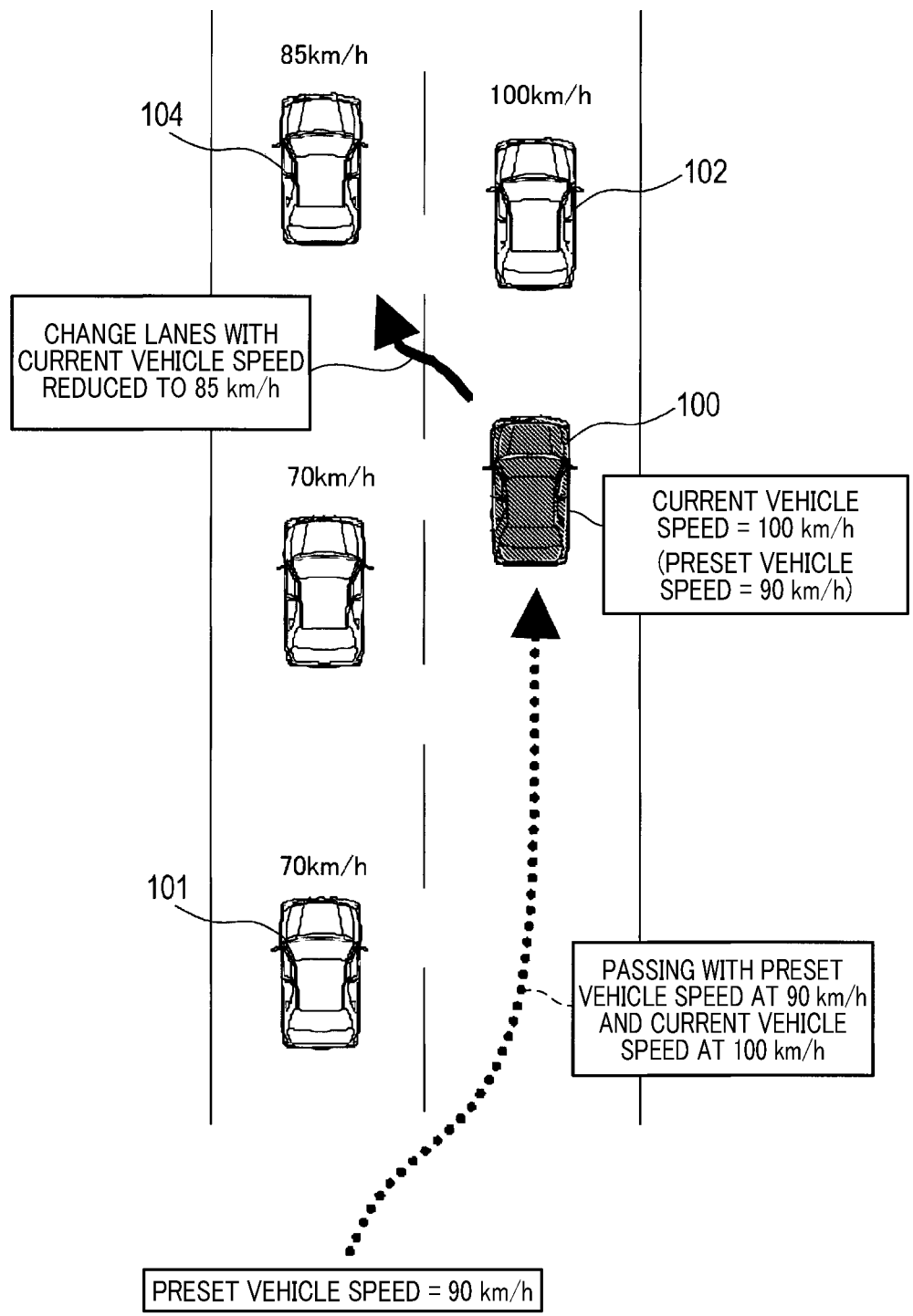
FIG. 8 is a diagram of an example of the behavior of the own vehicle in a variation example.

Specifically, in the flowchart of the tracking process shown in FIG. 3, steps S180 and S185 may be eliminated. The present tracking process may be ended when a negative determination is made at step S175 (NO at step S175). The workings of a configuration such as this will be described with reference to FIG. 8. In the example shown in FIG. 8, a state is shown in which, after the lane change is performed in the state shown in FIG. 5A, that is, the preceding vehicle 101 has been passed, the area of a size necessary for performing lane change is not present ahead of the preceding vehicle 101 that has been passed. In this case, when the driver of the own vehicle has not issued an instruction to change the preset vehicle speed to the current vehicle speed, the tracking process of this cycle is ended. Then, in the tracking process at the next cycle, output to set lane change by the own vehicle 100 as the recommended behavior is performed so that an adjacent vehicle 104 that has a small difference in speed from the preset vehicle speed is tracked.

(2) According to the above-described embodiment, when the recommended behavior is a lane change to the adjacent lane, should the speed of the adjacent vehicle be equal to or higher than the preset vehicle speed, the lane change is performed by the own vehicle being allowed to travel at a vehicle speed obtained by the change-amount upper limit value α being added to the preset vehicle speed. In this regard, when the speed of the adjacent vehicle is equal to or higher than the preset vehicle speed, the vehicle speed for the lane change may be set to a vehicle speed obtained by the change-amount upper limit value α being added to the preset vehicle speed as an upper limit value, based on the proportion by which the speed of the adjacent vehicle exceeds the preset vehicle speed.

2. Second Embodiment

[2-1. Configuration]

A basic configuration according to a second embodiment is similar to that according to the first embodiment. Therefore, descriptions of common configurations are omitted. Differences will mainly be described.

According to the above-described first embodiment, the control apparatus 15 performs control of the own vehicle based on the recommended behavior. In this regard, the second embodiment differs from the first embodiment in that the control apparatus 15 performs control regarding notification to the driver of the own vehicle based on the recommended behavior, rather than performing control of the own vehicle based on the recommended behavior. Specifically, the second embodiment differs in that steps S133 and S134 are added to the tracking process according to the first embodiment shown in FIGS. 2 and 3. In addition, step S155 is eliminated, and step S156 is added instead. Step S170 is eliminated, and steps S171 to S173 are added instead.

[2-2. Process]

Figure 9:
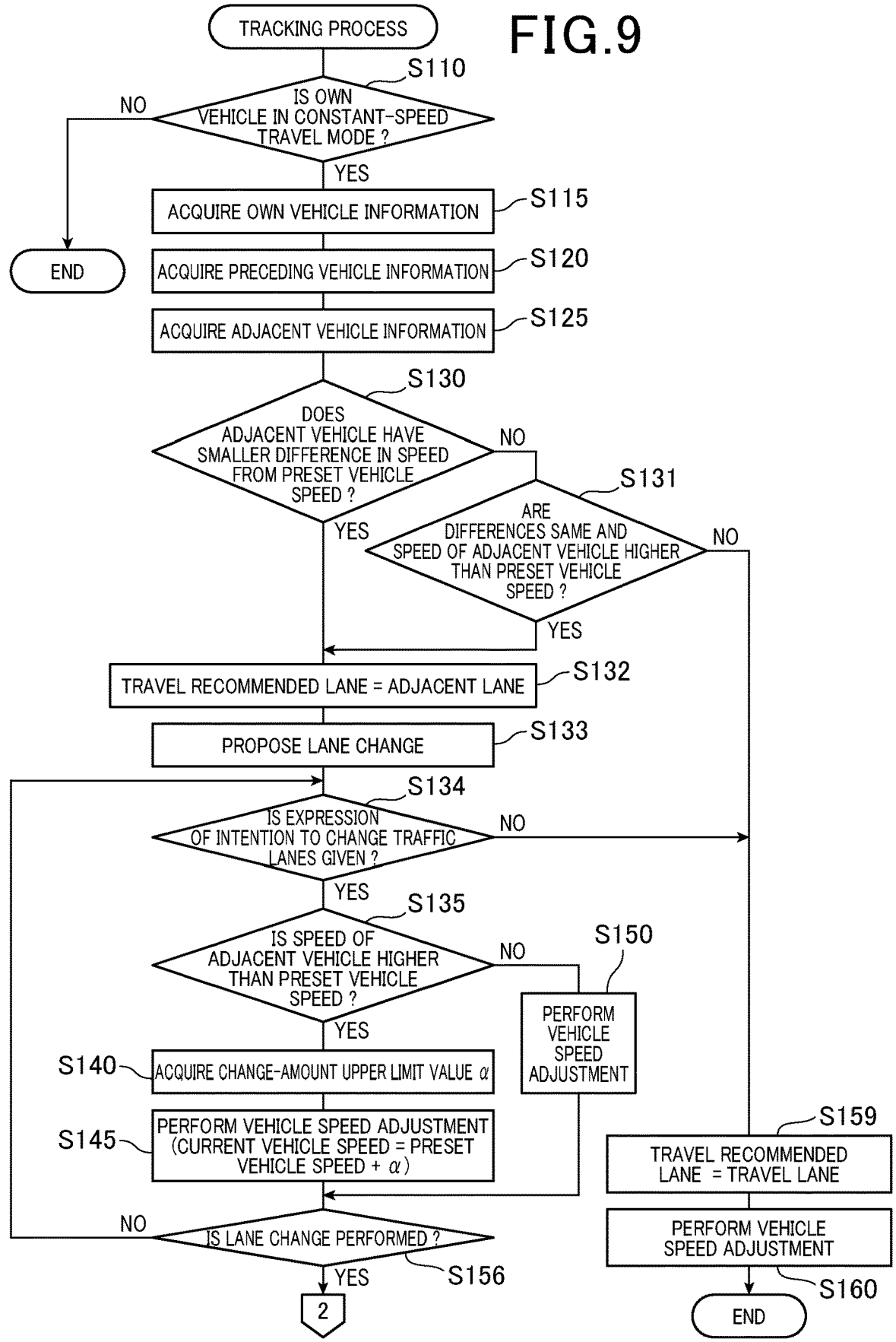
FIG. 9 is a flowchart (1/2) of a tracking process according to a second embodiment.
Figure 10:
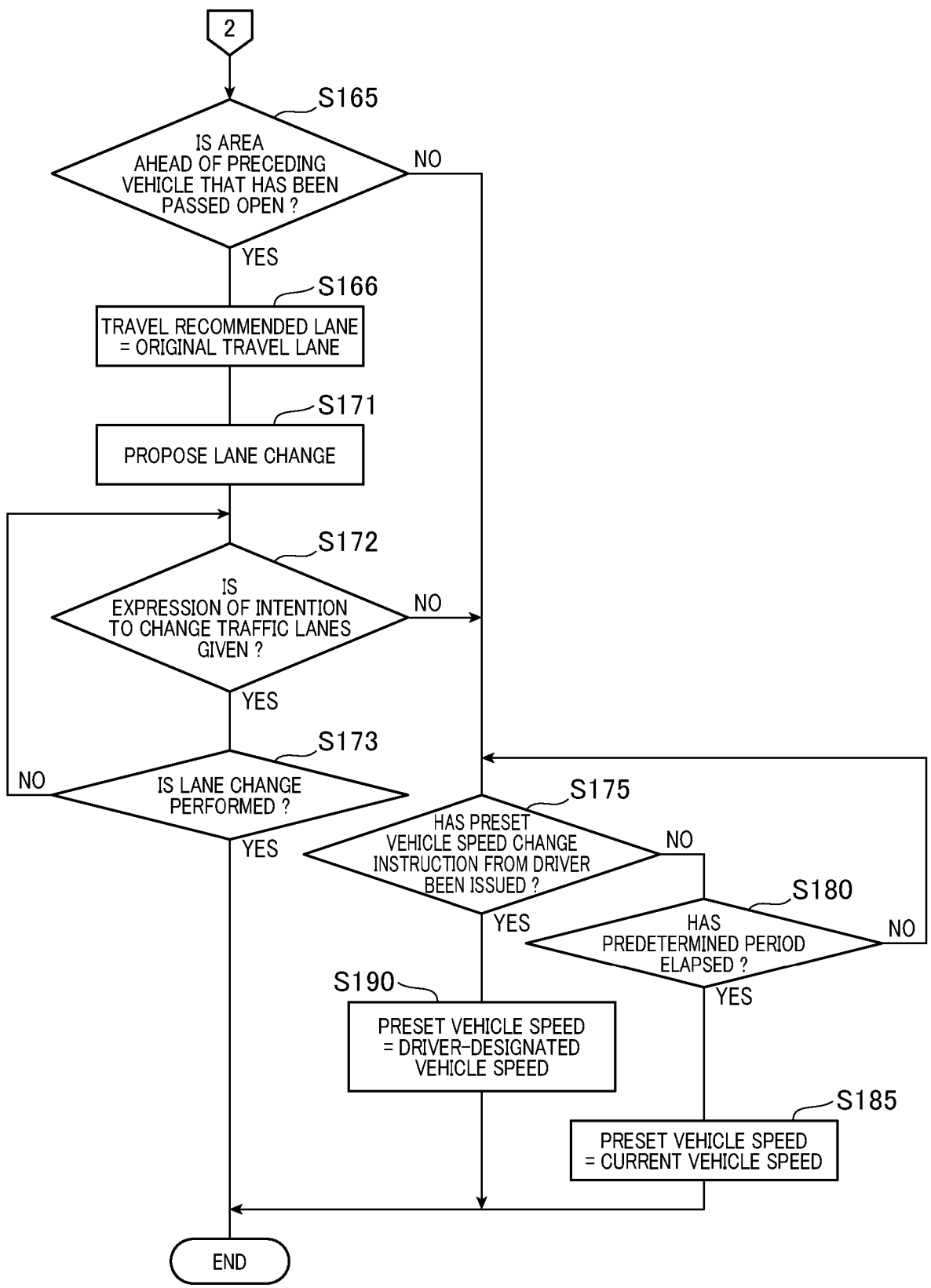
FIG. 10 is a flowchart (2/2) of the tracking process according to the second embodiment.

Next, the tracking process according to the present embodiment will be described with reference to the flowcharts in FIGS. 9 and 10.

At steps S110 to S130, the control apparatus 15 performs processes similar to those according to the first embodiment.

When lane change is set as the recommended behavior (YES at step S130 or YES at step S131), when the adjacent lane is determined to be the travel recommended lane (step S132), the control apparatus 15 proceeds to step S133. At step S133, the control apparatus 15 performs output to notify passengers that lane change to the adjacent lane is recommended. Specifically, the control apparatus 15 outputs a command to perform notification recommending lane change using the speaker 143 or the display 144.

At subsequent step S134, the control apparatus 15 determines whether or not an expression of intention by the driver of the own vehicle to change traffic lanes is detected. Specifically, the control apparatus 15 determines that an expression of intention by the driver of the own vehicle to change traffic lanes is detected when, for example, the driver of the own vehicle operates a turn signal. Here, when determined that the expression of intention by the driver of the own vehicle to change traffic lanes is detected, the control apparatus 15 proceeds to step S135. The control apparatus 15 then performs processes similar to those according to the first embodiment at steps S135 to S150. That is, the control apparatus 15 performs speed adjustment of the own vehicle for lane change. Meanwhile, when determined that an expression of intention by the driver of the own vehicle to change traffic lanes is not detected, the control apparatus 15 proceeds to step S159. The control apparatus 15 determines that the travel lane is the travel recommended lane, in a manner similar to that according to the first embodiment. The control apparatus 15 then proceeds to step S160 and performs speed adjustment of the own vehicle for tracking the preceding vehicle. The control apparatus 15 then ends the present tracking process.

After completing the vehicle speed adjustment for lane change (step S145 or S150), the control apparatus 15 proceeds to step S156. At step S156, the control apparatus 15 determines whether or not lane change of the own vehicle has been performed by operation by the driver of the own vehicle. Specifically, the control apparatus 15 determines that the lane change of the own vehicle has been performed when, for example, the own vehicle straddles a traffic lane between the travel lane and the adjacent lane. Here, when determined that lane change of the own vehicle has not been performed, the control apparatus 15 proceeds to step S134. That is, the control apparatus 15 performs confirmation regarding whether or not the lane change has actually been performed (step S156) while the expression of intention by the driver of the own vehicle to change traffic lanes is being given (YES at step S134). Meanwhile, when determined that the lane change of the own vehicle has been performed, the control apparatus 15 proceeds to step S165.

At step S165, in a manner similar to that according to the first embodiment, the control apparatus 15 determines whether or not an area of a size necessary for performing lane change is present ahead of the preceding vehicle that has been passed by lane change. When determined that the area is present, the control apparatus 15 proceeds to step S166. When determined that the area is not present, the control apparatus 15 proceeds to step S175. The control apparatus 15 performs processes similar to those according to the first embodiment at steps S175 to S190.

When the area of a size necessary for performing lane change is present ahead of the preceding vehicle that has been passed (YES at step S165), the control apparatus 15 proceeds to step S166. At step S166, the control apparatus 15 determines that the original travel lane is the travel recommended lane in a manner similar to that according to the first embodiment. The control apparatus 15 then proceeds to step S171.

Next, at step S171, the control apparatus 15 performs notification proposing lane change to the driver of the own vehicle. Specifically, in a manner similar to that at step S133, the control apparatus 15 outputs a command to perform notification proposing lane change using the speaker 143 or the display 144.

At subsequent step S172, the control apparatus 15 determines whether or not an expression of intention by the driver of the own vehicle to change traffic lanes is detected. Specifically, in a manner similar to that at step S132, the control apparatus 15 determines that the expression of intention by the driver of the own vehicle to change traffic lanes is detected when, for example, the driver of the own vehicle operates a turn signal. Here, when determined that an expression of intention by the driver of the own vehicle to change traffic lanes is detected, the control apparatus 15 proceeds to step S173. At step S173, the control apparatus 15 waits until the lane change of the own vehicle is performed by operation by the driver of the own vehicle. After the lane change is performed, the control apparatus 15 ends the present tracking process. Meanwhile, when determined that an expression of intention by the driver of the own vehicle to change traffic lanes is not detected, the control apparatus 15 proceeds to step S175. The control apparatus 15 performs speed adjustment of the own vehicle for tracking the preceding vehicle after lane change, that is, the original adjacent vehicle (steps S175 to S190) and ends the present tracking process.

[2-4. Workings]

In the examples shown in FIGS. 5A to 5C and 6, according to the present embodiment, notification proposing lane change to the driver of the own vehicle is performed.

[2-3. Effects]

According to the second embodiment described in detail above, the following effect is achieved in addition to the above-described effect [1A] according to the first embodiment.

[2A] When determined that the travel recommended lane is the adjacent lane at step S132, at step S133, the control apparatus 15 performs output for notification recommending lane change to the adjacent lane to the passengers of the own vehicle. As a result of a configuration such as this, notification prompting lane change is performed when the recommended behavior is lane change. Therefore, the driver of the own vehicle can allow the own vehicle to travel in time with the flow of traffic at the designated speed (driver-designated vehicle speed) or a speed close to the preset vehicle speed, based on the notification.

According to the second embodiment, step S133 corresponds to an example of a process serving as an output means.

In the configuration [4F] described hereafter, steps S133 and S171 correspond to an example of a process serving as an output means.

3. Third Embodiment 3-1. Configuration

A basic configuration according to a third embodiment is similar to that according to the first embodiment. Therefore, descriptions of common configurations are omitted. Differences will mainly be described.

According to the above-described first embodiment, when the area ahead of the preceding vehicle that has been passed after lane change is not open (NO at step S165), the control apparatus 15 performs control of the own vehicle to directly track the preceding vehicle, that is, the adjacent vehicle before the lane change. In this regard, the third embodiment differs from the first embodiment in that the control apparatus 15 determines the travel recommended lane in which the own vehicle is to travel and performs control until the own vehicle returns to the original travel lane after lane change is performed to allow the own vehicle to travel in the travel recommended lane. Specifically, the control apparatus 15 performs a lane selection process instead of the tracking process according to the first embodiment.

3-2. Process

[3-2-1. Lane Selection Process]

Figure 11:
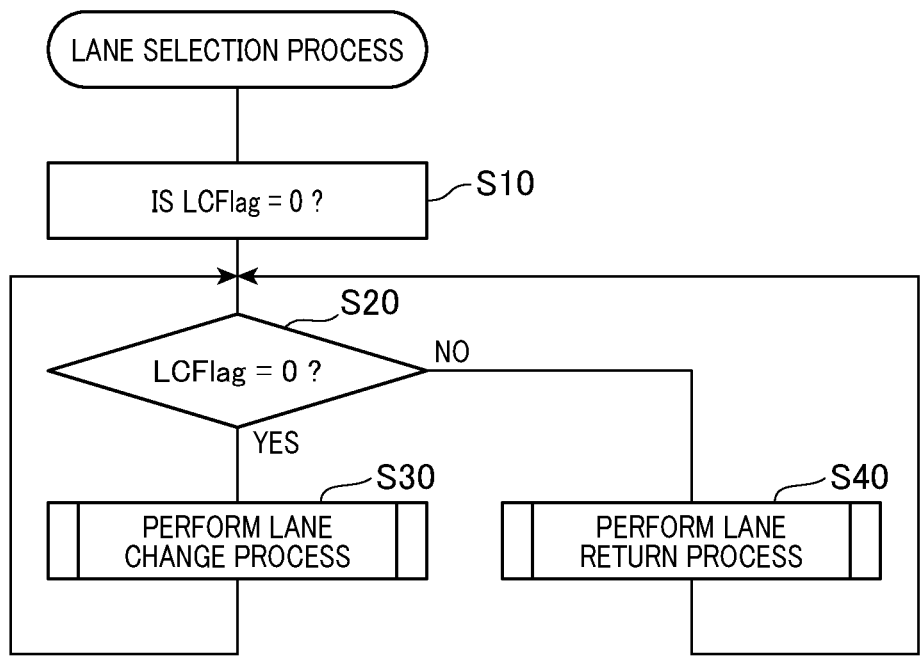
FIG. 11 is a flowchart of a lane selection process according to a third embodiment.

The lane selection process will be described with reference to the flowchart in FIG. 11. The lane selection process is repeatedly performed while the own vehicle is set to constant-speed travel mode and is traveling on a road in which lane change is possible. In cases in which the subject is omitted in the description below, the subject is the control apparatus 15.

At step S10, the control apparatus 15 resets a lane change flag (LCFlag, hereafter). That is, 0 is set as the value of the lane change flag LCFlag. The lane change flag LCFlag is a flag that indicates whether lane change has not yet been performed (the own vehicle is traveling in the travel lane) or lane change has been performed (the own vehicle is traveling in the adjacent lane). The lane change flag LCFlag is set to 1 when lane change from the travel lane to the adjacent lane is performed. The lane change flag LCFlag is set to 0 when lane change from the adjacent lane to the original travel lane is further performed.

At step S20, the control apparatus 15 determines whether or not the lane change flag LCFlag is 0. When determined that the lane change flag LCFlag is 0, the control apparatus 15 proceeds to step S30. When determined that the lane change flag LCFlag is not 0, the control apparatus 15 proceeds to step S40.

At step S30, the control apparatus 15 performs a lane change process. As described hereafter, the lane change process is a process to allow the own vehicle to perform lane change based on the preset vehicle speed, a traveling state of the preceding vehicle, and a traveling state of the adjacent vehicle. After performing the lane change process, the control apparatus 15 proceeds to step S20. Then, the control apparatus 15 repeatedly performs the processes at step S20 and subsequent steps.

At step S40, the control apparatus 15 performs a lane return process. As described hereafter, the lane return process is a process to allow the own vehicle to return to the traffic lane in which the own vehicle had been traveling before the lane change, based on the preset vehicle speed, the traveling state of the preceding vehicle, and the traveling state of the adjacent vehicle. After performing the lane return process, the control apparatus 15 proceeds to step S20. Then, the control apparatus 15 repeatedly performs the processes at step S20 and subsequent steps.

That is, when the lane change from the travel lane to the adjacent lane is performed (LCFlag=1), the control apparatus 15 repeatedly performs the lane return process until the own vehicle is returned by performing lane change once again to the traffic lane in which the own vehicle had been traveling before the lane change was performed.

[3-2-2. Lane Change Process]

Next, the lane change process performed at step S30 of the lane selection process will be described with reference to the flowcharts in FIGS. 12 and 13. The lane change process is a process for determining the travel recommended lane in which the own vehicle is to travel, based on a comparison of the preset vehicle speed to the traveling state of the preceding vehicle and the traveling state of the adjacent vehicle, and performing output based on the travel recommended lane.

The traveling state of the preceding vehicle refers to the state in which the preceding vehicle is traveling. For example, whether or not a preceding vehicle is present, the speed of the preceding vehicle, and the distance from the own vehicle can be given as the traveling state of the preceding vehicle. The traveling state of the adjacent vehicle refers to the state in which the adjacent vehicle is traveling. For example, whether or not an adjacent vehicle is present, the speed of the adjacent vehicle, and the distance from the own vehicle can be given as the traveling state of the adjacent vehicle.

The lane change process differs in that steps S100, S126 to S129, S136, S141, S156 to S158, S161 to S163 are added to the tracking process according to the first embodiment shown in FIGS. 2 and 3. In addition, steps S110, S145, and S150 are eliminated.

At step S100, the control apparatus 15 sets a speed flag (VFlag, hereafter) to 0. The speed flag VFlag is a flag that indicates the state of the speed of the own vehicle. The speed flag VFlag being set to 0 indicates that the own vehicle traveling at the preset vehicle speed.

At steps S115 to S125, the control apparatus 15 performs processes similar to those at steps S115 to S125 in FIG. 2.

At step S126, the control apparatus 15 determines whether or not the speed of the preceding vehicle is slower than the preset vehicle speed. Specifically, the control apparatus 15 determines that the speed of the preceding vehicle is slower than the preset vehicle speed when the vehicle speed of the preceding vehicle is equal to or lower than the preset vehicle speed. When determined that the vehicle speed of the preceding vehicle is equal to or lower than the preset vehicle speed, the control apparatus 15 proceeds to step S127. When determined that the vehicle speed of the preceding vehicle is higher than the preset vehicle speed, the control apparatus 15 proceeds to step S129. In cases in which a basic preset vehicle speed is mentioned in the description hereafter, the basic preset vehicle speed refers to the preset vehicle speed when the own vehicle is traveling in the travel lane at the time the present step is performed, that is, the preset vehicle speed before lane change to the adjacent lane, which is a passing lane, is performed.

In addition, at the present step, when the preceding vehicle information acquired at step S120 indicates that a preceding vehicle is not present in the travel lane, the control apparatus 15 determines that the vehicle speed of the preceding vehicle is infinite. That is, when the vehicle speed of the preceding vehicle is higher than the basic preset vehicle speed and when the preceding vehicle is not present, the control apparatus 15 proceeds to step S129.

At step S129, the control apparatus 15 prohibits determination regarding the travel recommended lane at steps S132 and S159. The control apparatus 15 then ends the present lane change process. That is, the control apparatus 15 ends the present lane change process without performing the processes at steps S132 and S159.

When determined that the vehicle speed of the preceding vehicle is equal to or lower than the basic preset vehicle speed, the control apparatus 15 proceeds to step S127. At step S127, the control apparatus 15 determines whether or not a predetermined area is present in the adjacent lane. The predetermined area refers to an area that, when a direction perpendicular to a direction of the travel lane on a horizontal plane (a tangent direction in cases in which the travel lane is curved) is a lateral direction, and the own vehicle is moved in the lateral direction and positioned within the adjacent lane, is within a range away from the position of the own vehicle to the front and to the rear by a distance prescribed in advance, and in which another vehicle is not present.

The distance prescribed in advance is a distance necessary when the own vehicle performs lane change from to the adjacent lane. The distance is set based on the speed of the own vehicle, the speed limit of the road, the timing at which a driver of an adjacent vehicle typically applies the brakes, and the like. The distance prescribed in advance is recorded in the external recording apparatus 16.

When determined that the predetermined area is not present in the adjacent lane, the control apparatus 15 proceeds to step S155. When determined that the predetermined area is present in the adjacent lane, the control apparatus 15 proceeds to step S128.

At step S128, the control apparatus 15 determines whether or not an adjacent vehicle is present outside of the predetermined area referred to at step S127 in the adjacent lane, based on output from the radar sensor 112. When determined that an adjacent vehicle is not present, the control apparatus 15 proceeds to step S155. When determined that an adjacent vehicle is present, the control apparatus 15 proceeds to step S130.

At steps S130 to S135, the control apparatus 15 performs processes similar to those at steps S130 to S135 in FIG. 2.

That is, at step S130, the control apparatus 15 determines whether or not, of the preceding vehicle and the adjacent vehicle, the adjacent vehicle has the smaller difference in speed from the basic preset vehicle speed. Specifically, the control apparatus 15 compares the traveling state of the preceding vehicle and the traveling state of the adjacent vehicle to the basic preset vehicle speed, based on the own vehicle information, the preceding vehicle information, and the adjacent vehicle information acquired at steps S115 to S125, and determines the smaller of the difference between the speed of the preceding vehicle and the basic preset vehicle speed and the difference between the speed of the adjacent vehicle and the basic preset vehicle speed.

Here, when determined that the difference between the speed of the adjacent vehicle and the basic preset vehicle speed is smaller than the difference between the speed of the preceding vehicle and the basic preset vehicle speed, the control apparatus 15 proceeds to step S132. Meanwhile, when determined that the difference between the speed of the adjacent vehicle and the basic preset vehicle speed is equal to or greater than the difference between the speed of the preceding vehicle and the basic preset vehicle speed, the control apparatus 15 proceeds to step S131.

At step S131, the control apparatus 15 makes an affirmative determination when the difference between the speed of the preceding vehicle and the basic preset vehicle speed and the difference between the speed of the adjacent vehicle and the basic preset vehicle speed are the same, and the speed of the adjacent vehicle is higher than the basic preset vehicle speed. The control apparatus 15 then proceeds to step S132. Meanwhile, when a negative determination is made, the control apparatus 15 proceeds to step S159.

At step S159, the control apparatus 15 determines that the travel lane is the travel recommended lane. Then, the control apparatus 15 proceeds to step S160. That is, the control apparatus 15 determines that the travel lane is the travel recommended lane when the difference between the speed of the adjacent vehicle and the basic preset vehicle speed is greater than the difference between the speed of the preceding vehicle and the basic preset vehicle speed, or when the difference between the speed of the preceding vehicle and the basic preset vehicle speed and the difference between the speed of the adjacent vehicle and the basic preset vehicle speed are the same and the speed of the adjacent vehicle is lower than the basic preset vehicle speed (NO at step S131).

In this way, the control apparatus 15 determines the traffic lane in which the vehicle having the speed closer to the basic preset vehicle speed, of the speed of the preceding vehicle and the speed of the adjacent vehicle, is traveling as the travel recommended lane of the own vehicle. In addition, the control apparatus 15 sets the travel recommended lane such that the amount of deceleration during traveling at the basic preset vehicle speed is small.

Next, at step S160, the control apparatus 15 performs vehicle speed adjustment of the own vehicle in a manner similar to that at step S160 shown in FIG. 2 and performs the present lane change process. According to the present embodiment, the control apparatus 15 outputs a command to the driving assistance execution apparatus 14 to allow the own vehicle to travel at the same speed as the vehicle speed of the preceding vehicle.

At step S132, the control apparatus 15 determines that the adjacent lane is the travel recommended lane. Then, the control apparatus 15 proceeds to step S135. That is, the control apparatus 15 determines that the adjacent lane is the travel recommended lane when the difference between the speed of the adjacent vehicle and the basic preset vehicle speed is smaller than the difference between the speed of the preceding vehicle and the basic preset vehicle speed (YES at step S130) or when the difference between the speed of the preceding vehicle and the basic preset vehicle speed and the difference between the speed of the adjacent vehicle and the basic preset vehicle speed are the same, and the speed of the adjacent vehicle is higher than the basic preset vehicle speed (YES at step S131).

In this way, the control apparatus 15 determines the traffic lane in which the vehicle having the speed closer to the basic preset vehicle speed, of the speed of the preceding vehicle and the speed of the adjacent vehicle, is traveling as the travel recommended lane of the own vehicle. In addition, the control apparatus 15 sets the travel recommended lane such that the amount of deceleration during traveling at the basic preset vehicle speed is small.

Next, at step S135, the control apparatus 15 determines whether or not the speed of the adjacent vehicle is higher than the basic preset vehicle speed. When determined that the speed of the adjacent vehicle is higher than the basic preset vehicle speed, the control apparatus 15 proceeds to step S140. When determined that the speed of the adjacent vehicle is equal to or lower than the basic preset vehicle speed, the control apparatus 15 proceeds to step S136.

At step S136, the control apparatus 15 sets the speed flag VFlag to 2 and proceeds to step S155. The speed flag VFlag being set to 2 indicates that the own vehicle is traveling at the preset vehicle speed (basic preset vehicle speed) or lower.

When an affirmative determination is made at step S135 (YES at step S135), the control apparatus 15 proceeds to step S140. At step S140, the control apparatus 15 performs a process similar to that at step S140 in FIG. 2 and then proceeds to step S141.

At step S141, the control apparatus 15 sets the speed flag VFlag to 1 and then proceeds to step S155. The speed flag VFlag being set to 1 indicates that the own vehicle is traveling at a speed higher than the preset vehicle speed (basic preset vehicle speed).

When determined that an adjacent vehicle is not present in the adjacent lane (NO at step S128) or when determined that the adjacent lane is the travel recommended lane, the control apparatus 15 proceeds to step S155. At step S155, the control apparatus 15 performs output to perform travel control of the own vehicle to change traffic lanes to the adjacent lane. That is, the control apparatus 15 performs output to the driving assistance execution apparatus 14

(steering apparatus 141) to perform travel control of the own vehicle such that the own vehicle changes traffic lanes to the adjacent lane.

At subsequent step S156, the control apparatus 15 sets the lane change flag LCFlag to 1.

Next, at step S157, the control apparatus 15 determines whether or not the speed flag VFlag is 1. When determined that the speed flag VFlag is 1, the control apparatus 15 proceeds to step S163. When determined that the speed flag VFlag is not 1, the control apparatus 15 proceeds to step S158.

When determined that the speed flag VFlag is not 1, the control apparatus 15 proceeds to step S158. At step S158, the control apparatus 15 determines whether or not the speed flag VFlag is 2. When determined that the speed flag VFlag is 2, the control apparatus 15 proceeds to step S162. When determined that the speed flag VFlag is not 2, the control apparatus 15 proceeds to step S161.

When determined that the speed flag VFlag is not 2, the control apparatus 15 proceeds to step S161. At step S161, the control apparatus 15 performs vehicle speed adjustment of the own vehicle. Specifically, the control apparatus 15 outputs a command to the driving assistance execution apparatus 14 to allow the own vehicle to travel at the basic preset vehicle speed. The control apparatus 15 then ends the present lane change process.

When determined that the speed flag VFlag is 2, the control apparatus 15 proceeds to step S162. At step S162, the control apparatus 15 performs vehicle speed adjustment of the own vehicle. Specifically, the control apparatus 15 outputs a command to the driving assistance execution apparatus 14 to allow the own vehicle to travel at the same speed as the adjacent vehicle. The control apparatus 15 then ends the present lane change process. The adjacent vehicle here refers to the adjacent vehicle before the own vehicle performs lane change. That is, the adjacent vehicle refers to the vehicle that is traveling ahead of the own vehicle in the traffic lane in which the own vehicle is traveling after the lane change is performed (step S155).

When determined that the speed flag VFlag is 1, the control apparatus 15 proceeds to step S163. At step S163, the control apparatus 15 performs vehicle speed adjustment of the own vehicle. Specifically, the control apparatus 15 outputs a command to the driving assistance execution apparatus 14 to allow the own vehicle to travel at a speed higher than the basic preset vehicle speed. The control apparatus 15 then ends the present lane change process. The speed at which the own vehicle travels is set to be equal to or lower than a speed obtained by the change-amount upper limit value $\alpha$ being added to the preset vehicle speed.

[3-2-2. Lane Return Process]

Figure 14:
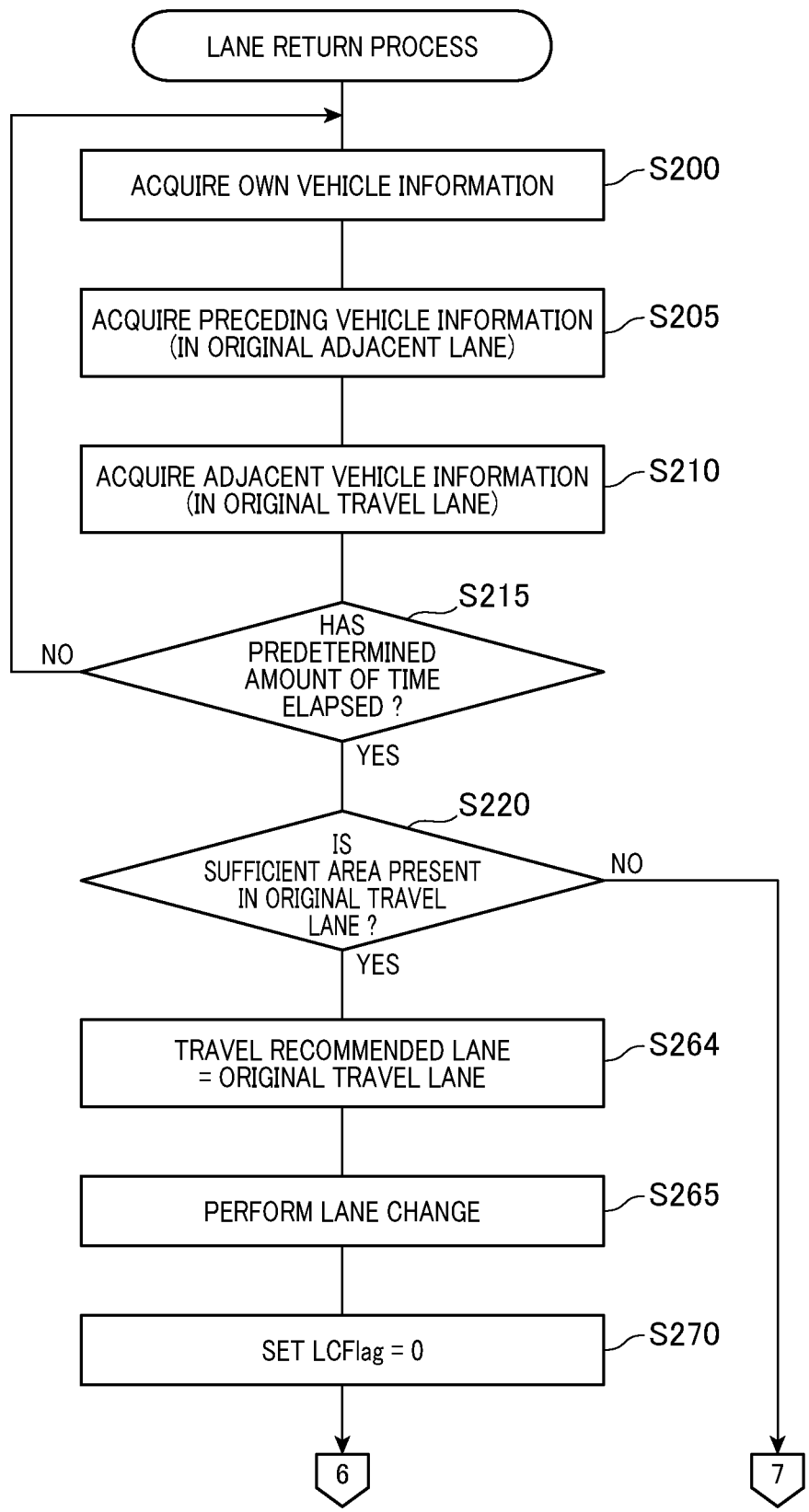
FIG. 14 is a flowchart (1/2) of a lane return process according to the third embodiment.
Figure 15:
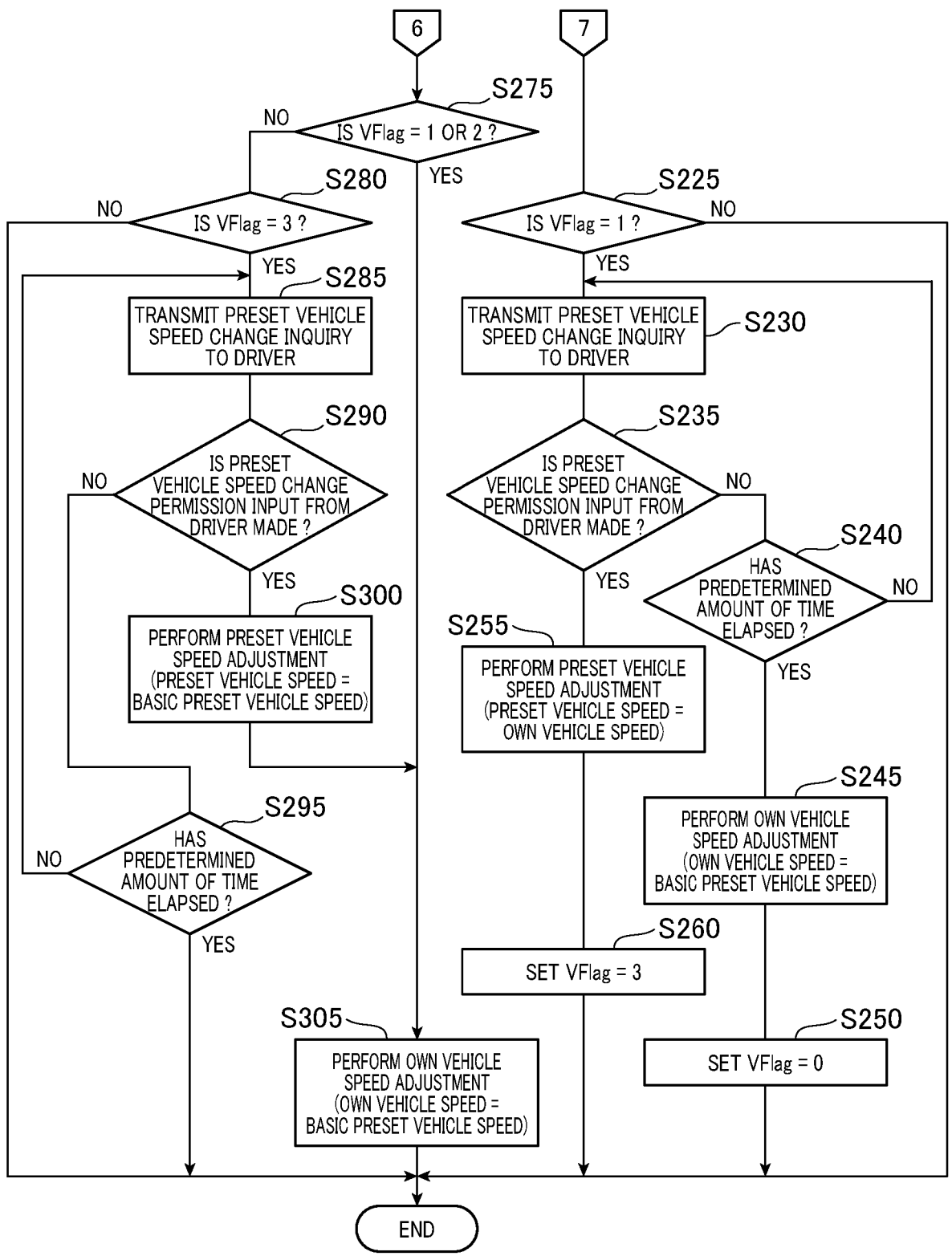
FIG. 15 is a flowchart (2/2) of the lane return process according to the third embodiment.

Next, the lane return process performed at step S40 of the lane selection process will be described with reference to the flowchart in FIGS. 14 and 15. The lane return process is a process for returning the own vehicle to the traffic lane in which the own vehicle had been traveling before performing lane change, after the lane change of the own vehicle is performed in the lane change process.

Figure 12:
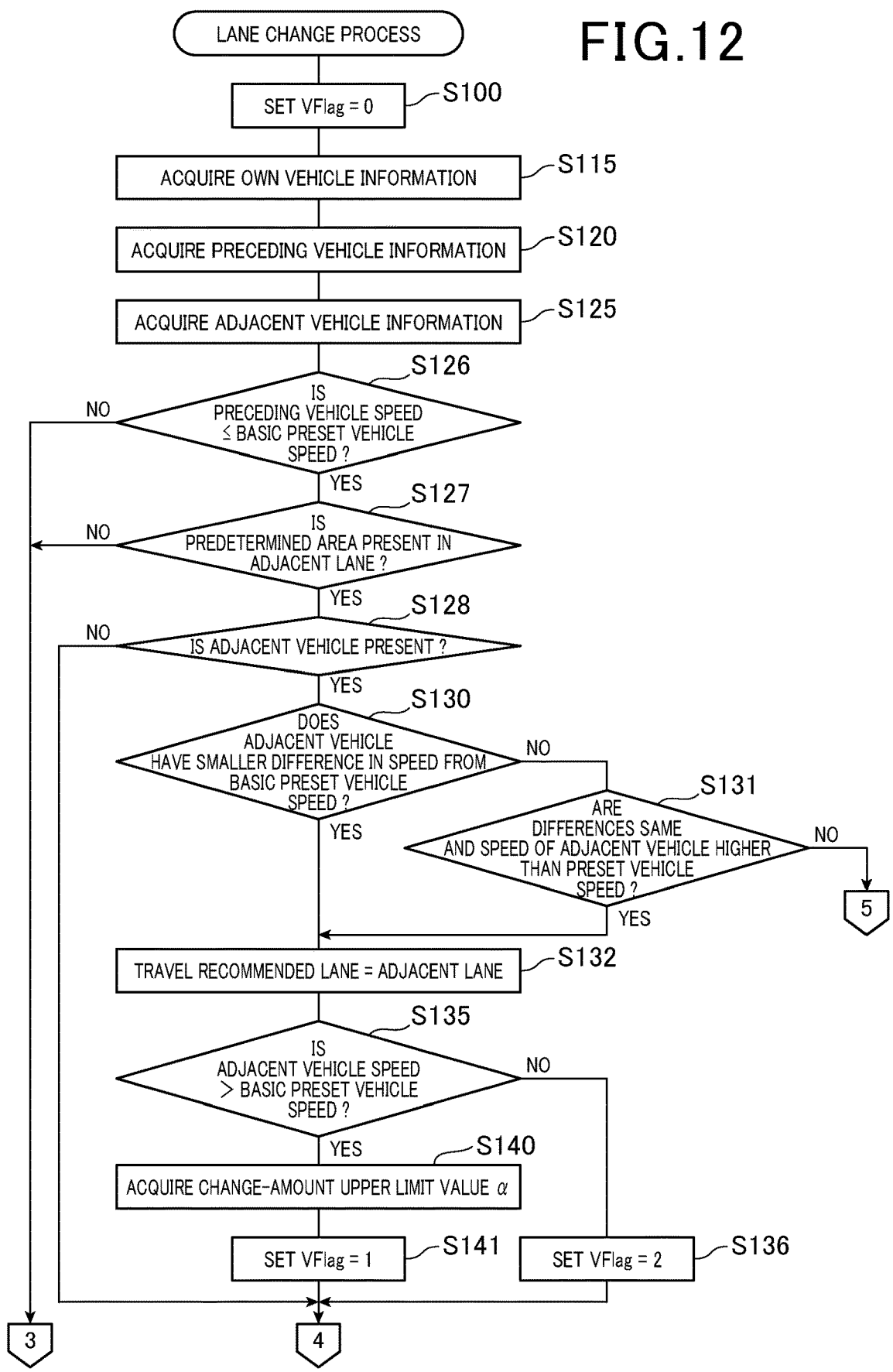
FIG. 12 is a flowchart (1/2) of a lane change process according to the third embodiment.
Figure 13:
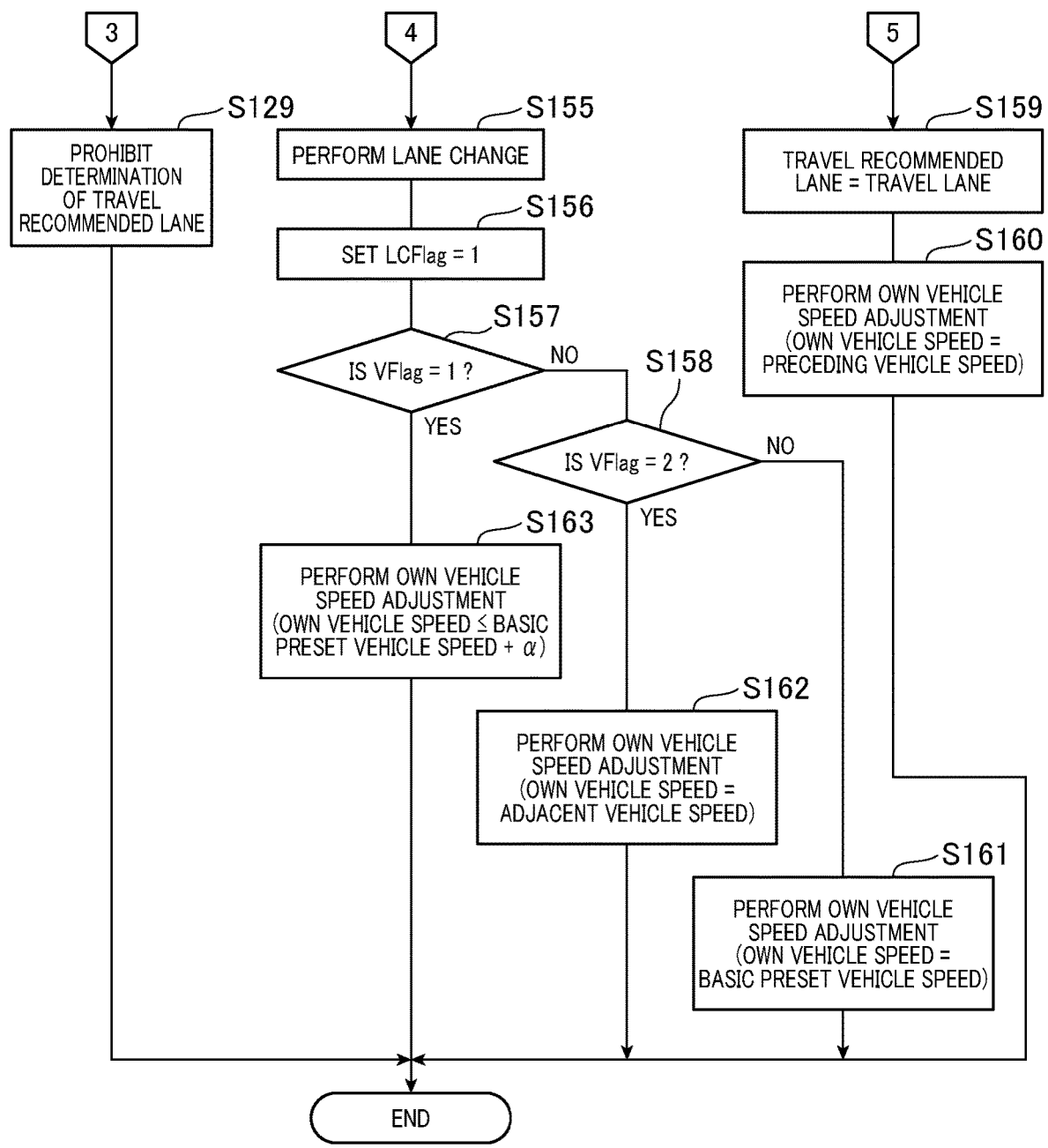
FIG. 13 is a flowchart (2/2) of the lane change process according to the third embodiment.

At step S200, the control apparatus 15 acquires the own vehicle information in a manner similar to that at step S115 shown in FIG. 12.

At step S205, the control apparatus acquires the preceding vehicle information in a manner similar to that at step S120 shown in FIG. 12. However, the preceding vehicle here refers to a vehicle that is traveling ahead of the own vehicle in the traffic lane in which the own vehicle is traveling after lane change by the lane change process (step S155) is performed, that is, the vehicle in the adjacent lane before the own vehicle performs the lane change.

At step S210, the control apparatus 15 acquires the adjacent vehicle information in a manner similar to that at step S125 shown in FIG. 12. However, the adjacent vehicle here refers to the vehicle traveling in the traffic lane adjacent to the traffic lane in which the own vehicle is traveling after lane change by the lane change process (step S155) is performed, that is, the vehicle in the travel lane before the own vehicle performs the lane change (referred to, hereafter, as the original travel lane).

At step S215, the control apparatus 15 determines whether or not lane change to the adjacent lane is completed. Here, completion of the lane change to the adjacent lane refers to the own vehicle passing the preceding vehicle in the original travel lane as a result of lane change. Specifically, the control apparatus 15 acquires the time elapsed from when the lane change was performed (step S155). When a predetermined amount of time has elapsed from when the lane change was performed, the control apparatus 15 determines that the lane change to the adjacent lane is completed. When determined that the predetermined amount of time has elapsed from when the lane change was performed, the control apparatus 15 proceeds to step S220. When determined that the predetermined amount of time has not elapsed, the control apparatus 15 proceeds to step S200 and repeats the processes at step S200 and subsequent steps. The time elapsed from when the lane change was performed is acquired based on a process performed by the control apparatus 15 as a process separate from the present lane return process.

At step S220, the control apparatus 15 determines whether or not a sufficient area, that is, an area prescribed in advance for the own vehicle to perform lane change is present in the original travel lane. The area prescribed in advance for the own vehicle to perform lane change refers to an area of a size necessary for performing lane change to return the own vehicle to the original travel lane. Specifically, the control apparatus 15 determines that the area prescribed in advance for the own vehicle to perform lane change is present, that is, a sufficient area is present in the original travel lane when another vehicle is not present ahead of the preceding vehicle that has been passed in the original travel lane, within the range of the above-described safety distance from the preceding vehicle that has been passed.

When determined that the sufficient area is present in the original travel lane, the control apparatus 15 proceeds to step S264. When determined that the sufficient area is not present, the control apparatus 15 proceeds to step S225.

The control apparatus 15 determines that the sufficient area is not present in the original travel lane at step S220 and proceeds to step S225. At step S225, the control apparatus 15 determines whether or not the speed flag VFlag is 1. When determined that the speed flag VFlag is 1, the control apparatus 15 proceeds to step S230. When determined that the speed flag VFlag is not 1, the control apparatus 15 ends the present lane return process.

At step S230, the control apparatus 15 outputs a command to the speaker 143 and the display 144 to transmit an inquiry to the driver of the own vehicle regarding whether or not to change the preset vehicle speed. That is, the control apparatus 15 makes an inquiry to the driver of the own vehicle using audio and an image displayed in the display 144 regarding whether or not to change the preset vehicle speed such as to set the current vehicle speed, which is higher than the basic preset vehicle speed, as a new preset vehicle speed.

Next, at step S235, the control apparatus 15 determines whether or not an input by the driver of the own vehicle permitting change in the present vehicle speed is made. The input by the driver of the own vehicle is performed through the display 144. Here, when determined that the input permitting change has been made, the control apparatus 15 proceeds to step S255. When determined that the input permitting change has not been made, the control apparatus 15 proceeds to step S240.

At step S240, the control apparatus 15 acquires the time elapsed from when the inquiry to the driver of the own vehicle is transmitted at step S230. When the elapsed time exceeds a predetermined amount of time, the control apparatus 15 proceeds to step S245. When the elapsed time does not exceed the predetermined amount of time, the control apparatus 15 proceeds to step S230 and repeats the processes at step S230 and subsequent steps. The time elapsed from when the inquiry to the driver of the own vehicle is transmitted is acquired based on a process performed by the control apparatus 15 as a process separate from the present lane return process.

At step S245, the control apparatus 15 outputs a command to the driving assistance execution apparatus 14 to allow the own vehicle to travel at the basic preset vehicle speed.

At subsequent step S250, the control apparatus 15 sets the speed flag VFlag to 0 and ends the present lane return process.

When determined that the input by the driver of the own vehicle permitting change in the preset vehicle speed is made at step S235, the control apparatus 15 proceeds to step S255. At step S255, the control apparatus 15 sets (records in the external recording apparatus 16) the current speed of the own vehicle, which is higher than the basic preset vehicle speed, as the new preset vehicle speed.

At subsequent step S260, the control apparatus 15 sets the speed flag VFlag to 3 and ends the present lane return process. The speed flag VFlag being set to 3 indicates that the own vehicle is traveling at a speed higher than the basic preset vehicle speed and the preset vehicle speed is also higher than the basic preset vehicle speed.

The control apparatus 15 determines that the sufficient area is present in the original travel lane at step S220 and proceeds to step S264. At step 264, the control apparatus 15 determines that the original travel lane is the travel recommended lane and records the original travel lane as the travel recommended lane in the RAM 53.

Next, at step S265, the control apparatus 15 performs output to allow the own vehicle to change traffic lanes to the original travel lane. Specifically, the control apparatus 15 outputs a command to the driving assistance execution apparatus 14 to perform lane change to the original travel lane.

At subsequent step S270, the control apparatus 15 sets the lane change flag LCFlag to 0.

Next, at step S275, the control apparatus 15 determines whether or not the speed flag VFlag is 1 or 2. When determined that the speed flag VFlag is 1 or 2, the control apparatus 15 proceeds to step S305. When determined that the speed flag VFlag is neither 1 nor 2 (the speed flag VFlag is either 0 or 3), the control apparatus 15 proceeds to step S280.

At step S280, the control apparatus 15 determines whether or not the speed flag VFlag is 3. Here, when determined that the speed flag VFlag is not 3 (the speed flag VFlag is 0), the control apparatus 15 ends the present lane return process. When determined that the speed flag VFlag is 3, the control apparatus 15 proceeds to step S285.

When determined that the speed flag VFlag is 3, the control apparatus 15 proceeds to step S285. At step S285, the control apparatus 15 outputs a command to the speaker 143 and the display 144 to transmit an inquiry to the driver of the own vehicle regarding whether or not to change the preset vehicle speed.

Next at step S290, the control apparatus 15 determines whether or not an input by the driver of the own vehicle permitting change in the preset vehicle speed is made. Here, when determined that the input permitting change is made through the display 144, the control apparatus 15 proceeds to step S300. When determined that the input permitting change is not made, the control apparatus 15 proceeds to step S295.

At step S295, the control apparatus 15 acquires the time elapsed from when the inquiry to the driver of the own vehicle is transmitted at step S285. When determined that the elapsed time exceeds a predetermined amount of time, the control apparatus 15 ends the present lane return process. When determined that the predetermined amount of time is not exceeded, the control apparatus 15 proceeds to step S285 and repeats the processes at step S285 and subsequent steps. The time elapsed from when the inquiry to the driver of the own vehicle is transmitted (step S285) is acquired based on a process performed by the control apparatus 15 as a process separate from the present lane return process.

When determined that the input by the driver of the own vehicle permitting change in the preset vehicle speed is made at step S290, the control apparatus 15 proceeds to step S300. At step S300, the control apparatus 15 sets (records in the external recording apparatus 16) the basic preset vehicle speed as the new preset vehicle speed.

At step S305, the control apparatus 15 outputs a command to the driving assistance execution apparatus 14 to allow the own vehicle to travel at the basic preset vehicle speed. The control apparatus 15 then ends the present lane return process.

3-3. Effects

According to the third embodiment described in detail above, the following effects are achieved.

[3A] The control apparatus 15 determines the travel recommended lane in which the own vehicle is to travel (steps S132 and S159) based on the comparison of the preset vehicle speed to the travel state of the preceding vehicle and the travel state of the adjacent vehicle. The preset vehicle speed is set in advance to allow the own vehicle to travel at a constant speed. The preceding vehicle is the vehicle traveling ahead of the own vehicle in the travel lane in which the own vehicle is traveling. The adjacent vehicle is the vehicle traveling ahead of the own vehicle in the adjacent lane that is adjacent to the travel lane. In addition, the control apparatus 15 performs output based on the travel recommended lane (steps S155, S163, S255, S265, and S300). As a result, the control apparatus 15 determines the travel recommended lane based on the comparison of the preset vehicle speed to the travel state of the preceding vehicle and the travel state of the adjacent vehicle. Therefore, the traffic lane in which the own vehicle is to travel can be suitably determined without the driver of the own vehicle themselves making the determination.

[3B] The control apparatus 15 may determine, as the travel recommended lane, the traffic lane in which the vehicle having the speed closer to the preset vehicle speed, of the speed of the preceding vehicle traveling ahead of the own vehicle in the travel lane and the speed of the adjacent vehicle traveling ahead of the own vehicle in the adjacent lane, is traveling (steps S132 and S159). That is, the travel recommended lane may be set such that the amount of deceleration during traveling at the preset vehicle speed is small.

When the preceding vehicle is traveling at a speed closer to the preset vehicle speed than the adjacent vehicle, output to allow the own vehicle to track the preceding vehicle is performed. When the adjacent vehicle is traveling at a speed closer to the preset vehicle than the preceding vehicle, output to perform lane change and allow the own vehicle to track the adjacent vehicle is performed. As a result, output to allow the own vehicle to travel in time with the flow of traffic at a speed close to the preset vehicle speed (that is, such that the amount of deceleration is small) can be performed.

[3C] At step S126, the control apparatus 15 may determine whether or not the speed of the preceding vehicle is slower than the preset vehicle speed. At step S132, the control apparatus 15 may determine the travel recommended lane based on the determination result at step S126. As a result, the travel recommended lane can be determined based on the speed of the preceding vehicle.

[3D] Specifically, at step S129, the control apparatus 15 may prohibit the determination regarding the travel recommended lane when determined that the speed of the preceding vehicle is faster than the preset vehicle speed at step S126. As a result, for example, when the vehicle speed of the preceding vehicle is higher than the preset vehicle speed and when the preceding vehicle is not present, the determination regarding the travel recommended lane is prohibited. Therefore, the own vehicle can be allowed to travel in the travel lane as is. That is, the own vehicle can be allowed to travel in the travel lane as is, in cases in which lane change is not required to be performed.

[3E] Specifically, at step S126, the control apparatus 15 may perform the determination regarding the travel recommended lane at step S132, when determined that the speed of the preceding vehicle is equal to or lower than the preset vehicle speed at step S126. As a result, when the vehicle speed of the preceding vehicle is equal to or lower than the preset vehicle speed, that is, when it is difficult for the own vehicle to continue traveling in the travel lane, lane change can be performed.

[3F] At step S155, the control apparatus 15 may perform output to perform travel control of the own vehicle such that the own vehicle changes traffic lanes to the adjacent lane, when determined that the travel recommended lane is the adjacent lane at step S132. As a result, automatic travel control of the own vehicle based on the recommended travel lane can be performed.

[3G] At step S163, the control apparatus 15 may perform output to allow the own vehicle to travel at the lane-change vehicle speed that is a speed equal to or higher than the preset vehicle speed (basic preset vehicle speed) after lane change to the adjacent lane is completed, when determined that the travel recommended lane is the adjacent lane at step S132 and the speed of the adjacent vehicle is higher than the preset vehicle speed (basic preset vehicle speed). As a result, the own vehicle can smoothly change traffic lanes in time with the flow of traffic. The lane-change vehicle speed here refers to the travel vehicle speed of the own vehicle after lane change to the adjacent lane.

[3H] The lane-change vehicle speed may be equal to or less than the value obtained by a predetermined upper limit value being added to the preset vehicle speed (basic preset vehicle speed). As a result, lane change being performed at a speed exceeding the skills of the driver of the own vehicle can be suppressed. Consequently, the driver of the own vehicle experiencing unease when performing lane change of the own vehicle can be suppressed.

[3I] At step S255, the control apparatus 15 may change the preset vehicle speed when, after lane change to the adjacent vehicle is completed (YES at step S215), an instruction from the driver of the own vehicle regarding change in preset vehicle speed is issued (YES at step S235) when the area prescribed in advance for lane change by the own vehicle is not present in the original travel lane (NO at step S220) and the speed of the preceding vehicle of the own vehicle is faster than the preset vehicle speed (basic preset vehicle speed) (YES at step S225).

As a result, after lane change to the adjacent lane is performed, the control apparatus 15 can adjust the vehicle speed of the own vehicle in the adjacent lane when lane change to the original travel lane is difficult. The own vehicle can thereby smoothly travel in time with the flow of traffic. In addition, because the change to the new preset vehicle speed is performed based on the instruction from the driver of the own vehicle, the driver experiencing unease that change to a new preset vehicle speed is performed without an instruction from the driver of the own vehicle can be suppressed.

[3J] At step S300, the control apparatus 15 may perform output to allow the own vehicle to change traffic lanes to the original travel lane and to change the preset vehicle speed to the preset vehicle speed before change (basic preset vehicle speed) when, after the preset vehicle speed is changed (step S255), the area for lane change by the own vehicle is present in the original travel lane (YES at step S220). As a result, the own vehicle can be allowed to travel in the original travel lane at the preset vehicle speed (basic preset vehicle speed) of when the own vehicle had been traveling in the original travel lane. Therefore, the own vehicle can travel at the speed originally desired by the driver of the own vehicle (the basic preset vehicle speed that is the speed at which the original travel lane had been traveled).

[3K] At step S265, the control apparatus 15 may perform output to allow the own vehicle to change traffic lanes to the original travel lane when, after the lane change to the adjacent lane is completed (YES at step S215), the area prescribed in advance for lane change by the own vehicle is present in the original travel lane (YES at step S220). As a result, because the own vehicle can return to the original traffic lane, the own vehicle can travel in the traffic lane (original travel lane) originally desired by the driver of the own vehicle.

[3L] At step S166, the control apparatus 15 may determine the travel lane in which the own vehicle had been traveling before performing lane change as the travel recommended lane, when the output to perform travel control of the own vehicle such that the own vehicle changes traffic lanes to the adjacent vehicle is performed at step S155. As a result, because the original travel lane is set as the travel recommended lane after the lane change is performed, the own vehicle can return to the original travel lane by the own vehicle being controlled such as to travel in the travel recommended lane.

According to the third embodiment, steps S132 and S159 correspond to an example of a process serving as a first determining means. Step S126 corresponds to an example of a process serving as a second determining means and a determination executing means. Step S129 corresponds to an example of a process serving as a determination prohibiting means. In addition, steps S155, S163, S255, S265, and S300 correspond to an example of a process serving as an output means. In addition, step S166 corresponds to an example of a process serving as a third determining means.

3-4. Variation Examples

According to the third embodiment, vehicle speed adjustment of the own vehicle at step S163 is performed after the lane change at step S155. However, the vehicle speed of the own vehicle may be adjusted in a manner similar to that at step S163, while the lane change at step S155 is being performed.

4. Other Embodiments

The embodiments of the present invention are described above. However, the present invention is not limited to the above-described embodiments. It goes without saying that various modes are possible.

[4A] According to the above-described embodiments, after lane change from the travel lane to the adjacent lane (step S155) is performed, travel control is performed such that the own vehicle is returned to the original travel lane, with the original travel lane as the travel recommended lane. In this regard, the control apparatus 15 may be configured such that, after lane change from the travel lane to the adjacent lane (step S155) is performed, the vehicle traveling ahead of the own vehicle in the adjacent lane (current travel lane) is set as a new preceding vehicle, the vehicle traveling in the original travel lane (current adjacent lane) is set as a new adjacent vehicle, and the traffic lane in which, of the new preceding vehicle and the new adjacent vehicle, the vehicle closer to the basic preset vehicle speed is traveling is determined to be the travel recommended lane. In addition, the control apparatus 15 may be configured such that output for controlling the own vehicle to travel in the travel recommended lane is performed.

In this case, for example, the preceding vehicle in the flowcharts in FIG. 2 and FIG. 3 may be replaced with the new preceding vehicle. The adjacent vehicle may be replaced with the new adjacent vehicle. The travel lane may be replaced with the current travel lane. The adjacent lane may be replaced with the current adjacent lane. The processes in the flowcharts in FIGS. 2 and 3 may thereby be performed.

[4B] According to the above-described embodiments, an example in which the own vehicle is traveling on a road composed of two traffic lanes, the travel lane and the adjacent lane, is described. However, the road is not limited thereto. The road may be composed of a plurality of traffic lanes, that is, two or more traffic lanes such as three traffic lanes or four traffic lanes.

[4C] A function provided by a single constituent element according to the above-described embodiments may be dispersed among a plurality of constituent elements. Functions provided by a plurality of constituent elements may be integrated in a single constituent element. In addition, at least a part of a configuration according the above-described embodiments may be replaced with a publicly known configuration providing a similar function. Furthermore, a part of a configuration according to the above-described embodiments may be omitted to an extent enabling the problem to be solved. Moreover, at least a part of a configuration according to the above-described embodiments may be added to or replace another configuration according to the above-described embodiments. Any embodiment included in the technical scope specified by the wordings recited in the scope of claims is an embodiment of the present invention.

[4D] The present invention can also be actualized by various modes, such as a program enabling the control apparatus 15 to function, a medium in which the program is recorded, and a driving assistance method, in addition to the above-described driving assistance system 1 and the control apparatus 15.

[4E] The present invention may be actualized by the following configurations.

(Configuration 1) A driving assistance apparatus that is a driving assistance apparatus (15) that is mounted in an own vehicle and performs driving assistance for the own vehicle, including: determining means (S130) that determines tracking, of a preceding vehicle and an adjacent vehicle, the vehicle traveling at a speed of which the difference from a preset vehicle speed is smaller as recommended behavior of the own vehicle, based on the difference between the speed of the preceding vehicle traveling ahead of the own vehicle in a travel lane and the preset vehicle speed, and the difference between the speed of the adjacent vehicle traveling ahead of the own vehicle in an adjacent lane that is adjacent to the travel lane, with a vehicle speed set in advance for making the own vehicle travel at a constant speed as the preset vehicle speed and a traffic lane in which the own vehicle is traveling as the travel lane; and output means (S133, S145, S150, S155, S160, S170, S171, S185, S190) that performs output based on the recommended behavior.

That is, output for making the own vehicle travel such as to track, of the preceding vehicle and the adjacent vehicle, the vehicle traveling at a speed closer to the preset vehicle speed is performed. For example, when the preceding vehicle is traveling at a speed closer to the preset vehicle speed than the adjacent vehicle, output for making the own vehicle track the preceding vehicle is performed. When the adjacent vehicle is traveling at a speed closer to the preset vehicle speed than the preceding vehicle, output for performing lane change and making the own vehicle track the adjacent vehicle is performed.

As a result of a configuration such as this, the own vehicle can be allowed to travel in time with the flow of traffic at a speed close to the preset vehicle speed.

(Configuration 2) A driving assistance apparatus that is the driving assistance apparatus according to configuration 1, wherein the determining means sets lane change to the adjacent lane as the recommended behavior when the difference between the speed of the adjacent vehicle and the preset vehicle speed is smaller than the difference between the speed of the preceding vehicle and the preset vehicle speed.

(Configuration 3) A driving assistance apparatus that is the driving assistance apparatus according to configuration 2, wherein the output means (S145, S150, S155, S160, S170, S185, S190) controls the own vehicle based on the recommended behavior.

(Configuration 4) A driving assistance apparatus that is the driving assistance apparatus according to configuration 3, wherein the output means (S145) allows the own vehicle to travel at a lane-change vehicle speed that is equal to or higher than the preset vehicle speed until lane change to the adjacent lane is completed, when the recommended behavior is the lane change to the adjacent lane and the speed of the adjacent vehicle is equal to or higher than the preset vehicle speed.

(Configuration 5) A driving assistance apparatus that is the driving assistance apparatus according to configuration 4, wherein the lane-change vehicle speed is equal to or less than a value obtained by a predetermined upper limit value being added to the preset vehicle speed.

(Configuration 6) A driving assistance apparatus that is the driving assistance apparatus according to configuration 4 or 5, wherein the output means (S170) allows the own vehicle to change traffic lanes to the traffic lane in which the preceding vehicle that has been passed is traveling, when, after the lane change is performed, an area of a size necessary for lane change is present ahead of the own vehicle that has been passed.

(Configuration 7) A driving assistance apparatus that is the driving assistance apparatus according to configuration 4 or 5, wherein the output means (S190) changes the preset vehicle speed to a speed designated by the driver of the own vehicle when an instruction from the driver of the own vehicle regarding change in the preset vehicle speed is given when the area of a size necessary for lane change is present ahead of the preceding vehicle that has been passed.

(Configuration 8) A driving assistance apparatus that is the driving assistance apparatus according to configuration 7, wherein the output means (S185) changes the preset vehicle speed to the lane-change vehicle speed after a predetermined period has elapsed when the instruction from the driver of the own vehicle regarding change in the preset vehicle speed is not given.

(Configuration 9) A driving assistance apparatus that is the driving assistance apparatus according to configuration 1 or 2, wherein the output means (S133, S171) performs control regarding notification to the driver of the own vehicle based on the recommended behavior.

REFERENCE SIGNS LIST

1: driving assistance system
14: driving assistance execution apparatus
15: control apparatus
51: CPU

The invention claimed is:

1. A driving assistance apparatus that is mounted in an own vehicle and performs driving assistance for the own vehicle to determine a travel recommended lane in which the own vehicle is to travel, the own vehicle traveling in a travel lane with respect to a preceding vehicle traveling ahead of the own vehicle in the travel lane and an adjacent vehicle traveling ahead of the own vehicle in an adjacent lane that is adjacent to the travel lane, the driving assistance apparatus comprising:
  a first determining section that determines, using a processor, the travel recommended lane based on a comparison of a preset vehicle speed of the own vehicle, set in advance to allow the own vehicle to travel at a constant speed, with a speed of the preceding vehicle and a speed of the adjacent vehicle, the first determining section determining the travel recommended lane based on which of the preceding vehicle or the adjacent vehicle has a speed closer to the preset vehicle speed; and
  an output section that performs, using the processor, an output based on the travel recommended lane to perform travel control of the own vehicle.

2. The driving assistance apparatus according to claim 1, further comprising:
  a second determining section that determines, using the processor, whether or not the speed of the preceding vehicle is slower than the preset vehicle speed, wherein the first determining section determines the travel recommended lane based on the determination result of the second determining section.

3. The driving assistance apparatus according to claim 2, further comprising:
  a determination prohibiting section that prohibits the determination regarding the travel recommended lane by the first determining section, in response to the second determining section determining that the speed of the preceding vehicle is higher than the preset vehicle speed.

4. The driving assistance apparatus according to claim 2, further comprising:
  determination executing section that allows the first determining section to perform the determination regarding the travel recommended lane, in response to the second determining section determining that the speed of the preceding vehicle is equal to or lower than the preset vehicle speed.

5. The driving assistance apparatus according to claim 1, wherein:
  the output section performs an output to notify a passenger of the own vehicle that lane change to the adjacent lane is recommended, in response to the first determining section determining that the travel recommended lane is the adjacent lane.

6. The driving assistance apparatus according to claim 1, wherein:
  the output section performs an output to perform travel control of the own vehicle to change traffic lanes to the adjacent lane, in response to the first determining section determining that the travel recommended lane is the adjacent lane.

7. The driving assistance apparatus according to claim 1, wherein:
  the output section performs an output to allow the own vehicle to travel at a lane-change vehicle speed that is equal to or higher than the preset vehicle speed until lane change to the adjacent lane is completed, in response to the first determining section determining that the travel recommended lane is the adjacent lane and the speed of the adjacent vehicle is higher than the preset vehicle speed.

8. The driving assistance apparatus according to claim 1, wherein:
  the output section performs an output to allow the own vehicle to travel at a lane-change vehicle speed that is equal to or higher than the preset vehicle speed after lane change to the adjacent lane is completed, in response to the first determining section determining that the travel recommended lane is the adjacent lane and the speed of the adjacent vehicle is higher than the preset vehicle speed.

9. The driving assistance apparatus according to claim 7, wherein:
  the lane-change vehicle speed is equal to or less than a value obtained by a predetermined upper limit value being added to the preset vehicle speed.

10. The driving assistance apparatus according to claim 1, wherein:
  the output section changes the preset vehicle speed in response to an instruction from a driver of the own vehicle regarding changing of the preset vehicle speed being given in response to, after lane change to the adjacent lane is completed, an area prescribed in advance for lane change by the own vehicle not being present in an original travel lane, and the speed of the vehicle traveling ahead of the own vehicle is higher than the preset vehicle speed.

11. The driving assistance apparatus according to claim 10, wherein:
the output section performs output to allow the own vehicle to change traffic lanes to the original travel lane and to change the preset vehicle speed to the preset vehicle speed before change in response to, after changing the preset vehicle speed, the area prescribed in advance for lane change by the own vehicle being present in the original travel lane.

12. The driving assistance apparatus according to claim 1, wherein:
the output section performs output to allow the own vehicle to change traffic lanes to the original travel lane in response to, after lane change to the adjacent lane is completed, the area prescribed in advance for lane change by the own vehicle being present in the original travel lane.

13. The driving assistance apparatus according to claim 6, further comprising:
a third determining section that determines, using the processor, the travel lane in which the own vehicle had traveled before lane change was performed as the travel recommended lane in response to the output section performing the output to perform travel control of the own vehicle to change traffic lanes to the adjacent lane.

14. A driving assistance method for performing driving assistance for an own vehicle to determine a travel recommended lane in which the own vehicle is to travel, the own vehicle traveling in a travel lane with respect to a preceding vehicle traveling ahead of the own vehicle in the travel lane and an adjacent vehicle traveling ahead of the own vehicle in an adjacent lane that is adjacent to the travel lane, the driving assistance method comprising:
determining a speed of the preceding vehicle;
determining a speed of the adjacent vehicle;
determining the travel recommended lane based on a comparison of a preset vehicle speed of the own vehicle, set in advance to allow the own vehicle to travel at a constant speed, to the speed of the preceding vehicle and the speed of the adjacent vehicle, the travel recommended lane being determined based on which of the preceding vehicle or the adjacent vehicle has a speed closer to the preset vehicle speed; and
performing an output, by the driving assistance apparatus, based on the travel recommended lane to perform travel control of the own vehicle.

* * * * *